(12) United States Patent
Smith et al.

(10) Patent No.: US 9,996,736 B2
(45) Date of Patent: Jun. 12, 2018

(54) LARGE VENUE SURVEILLANCE AND REACTION SYSTEMS AND METHODS USING DYNAMICALLY ANALYZED EMOTIONAL INPUT

(71) Applicant: Software AG USA, Inc., Reston, VA (US)

(72) Inventors: Leighton Smith, Concord, CA (US); Gareth Smith, Cambridge (GB)

(73) Assignee: Software AG USA, Inc., Reston, VA (US)

( * ) Notice: Subject to any disclaimer, the term of this patent is extended or adjusted under 35 U.S.C. 154(b) by 0 days. days.

(21) Appl. No.: 15/257,082

(22) Filed: Sep. 6, 2016

(65) Prior Publication Data

US 2017/0046566 A1    Feb. 16, 2017

Related U.S. Application Data

(63) Continuation of application No. 14/515,663, filed on Oct. 16, 2014, now Pat. No. 9,449,218.

(51) Int. Cl.
*G06K 9/00* (2006.01)

(52) U.S. Cl.
CPC ..... *G06K 9/00302* (2013.01); *G06K 9/00771* (2013.01); *G06K 9/00778* (2013.01)

(58) Field of Classification Search
CPC .......... G06K 9/00302; G06K 9/00778; G06K 9/00771
See application file for complete search history.

(56) References Cited

U.S. PATENT DOCUMENTS

| 5,925,108 A | 7/1999 | Johnson et al. |
| 6,367,034 B1 | 4/2002 | Novik et al. |

(Continued)

FOREIGN PATENT DOCUMENTS

| EP | 1 355 232 | 10/2003 |
| WO | 2013/118141 | 8/2013 |

OTHER PUBLICATIONS

Liljana Stojanovic et al., "Real-Time Monitoring of Web-Based Processes: A Use Case for the Event-Driven Advertisement," Business Process Management Workshops, BPM 2010 Workshops and Education Track, Hoboken, NJ, Copyright 2011, pp. 719-729.

(Continued)

*Primary Examiner* — John Strege
(74) *Attorney, Agent, or Firm* — Nixon & Vanderhye PC

(57) ABSTRACT

Certain example embodiments relate to large venue surveillance and reaction systems and/or methods that take into account both subjective emotional attributes of persons having relations to the large venues, and objective measures such as, for example, actual or expected wait times, current staffing levels, numbers of customers to be serviced, etc. Pre-programmed scenarios are run in real-time as events stream in over one or more electronic interfaces, with each scenario being implemented as a logic sequence that takes into account at least an aspect of a representation of an inferred emotional state. The scenarios are run to (a) determine whether an incident might be occurring and/or might have occurred, and/or (b) dynamically determine a responsive action to be taken. A complex event processing engine may be used in this regard. The analysis may be used in certain example embodiments to help improve customer satisfaction at the large venue.

30 Claims, 10 Drawing Sheets

(56) References Cited

U.S. PATENT DOCUMENTS

| | | |
|---|---|---|
| 6,438,618 B1 | 8/2002 | Lortz et al. |
| 6,480,826 B2 | 11/2002 | Pertrushin |
| 7,426,736 B2 | 9/2008 | Cole et al. |
| 8,095,613 B1 | 1/2012 | Perkowitz |
| 8,214,308 B2 | 7/2012 | Chu |
| 8,484,472 B2 | 7/2013 | Sherkin et al. |
| 8,554,457 B2 | 10/2013 | White et al. |
| 8,635,105 B2 | 1/2014 | Pradeep |
| 8,683,348 B1 | 3/2014 | Blank |
| 8,939,903 B2 | 1/2015 | Roberts |
| 8,977,573 B2 | 3/2015 | Daya |
| 2002/0026484 A1 | 2/2002 | Smith |
| 2002/0120559 A1 | 8/2002 | O'Mara |
| 2002/0161604 A1 | 10/2002 | Kardos |
| 2003/0103501 A1 | 6/2003 | Clem |
| 2003/0118974 A1 | 6/2003 | Obrador |
| 2003/0135575 A1 | 7/2003 | Marejka |
| 2003/0140139 A1 | 7/2003 | Marejka |
| 2004/0001616 A1 | 1/2004 | Gutta |
| 2004/0210159 A1 | 10/2004 | Kibar |
| 2005/0096958 A1 | 5/2005 | Rice |
| 2005/0183143 A1 | 8/2005 | Anderholm |
| 2006/0064464 A1 | 3/2006 | Kakivaya |
| 2006/0215023 A1 | 9/2006 | Coonce |
| 2007/0033050 A1* | 2/2007 | Asano ............... G06F 17/30026 704/270 |
| 2007/0118545 A1 | 5/2007 | Chandrasekharan et al. |
| 2008/0040110 A1 | 2/2008 | Pereg |
| 2008/0062881 A1 | 3/2008 | Martin |
| 2008/0109824 A1 | 5/2008 | Chen |
| 2009/0285456 A1 | 11/2009 | Moon |
| 2010/0037187 A1 | 2/2010 | Kondziela |
| 2010/0161362 A1 | 6/2010 | Shapira et al. |
| 2010/0194560 A1 | 8/2010 | Hojecki et al. |
| 2011/0091847 A1* | 4/2011 | Carroll ..................... G09B 7/00 434/236 |
| 2011/0250972 A1 | 10/2011 | Horbay |
| 2011/0276396 A1 | 11/2011 | Rathod |
| 2012/0185877 A1 | 7/2012 | McGuire et al. |
| 2012/0233051 A1 | 9/2012 | Sheldon |
| 2012/0254084 A1 | 10/2012 | Richter et al. |
| 2012/0278176 A1 | 11/2012 | Naor |
| 2012/0331003 A1 | 12/2012 | Chu-Carroll |
| 2013/0018702 A1 | 1/2013 | Smith et al. |
| 2013/0191520 A1 | 7/2013 | Khouri |
| 2013/0346067 A1 | 12/2013 | Bhatt |
| 2014/0095150 A1 | 4/2014 | Berjikly |
| 2014/0146683 A1 | 5/2014 | Stogner |
| 2014/0163960 A1 | 6/2014 | Dimitriadis |
| 2014/0257820 A1 | 9/2014 | Laperdon |
| 2014/0324959 A1 | 10/2014 | Hudson |
| 2014/0365334 A1 | 12/2014 | Hurewitz |
| 2015/0235655 A1 | 8/2015 | Dimitriadis |
| 2015/0356349 A1 | 12/2015 | Govindarajeswaran |
| 2015/0356675 A1 | 12/2015 | Schulz |
| 2015/0379355 A1 | 12/2015 | Kanga |
| 2016/0012530 A1 | 1/2016 | Gardner |
| 2016/0019608 A1 | 1/2016 | Smith |
| 2016/0048914 A1* | 2/2016 | Smith .................... G06Q 40/04 705/37 |
| 2016/0110591 A1 | 4/2016 | Smith et al. |

OTHER PUBLICATIONS

Robin Gilthorpe, "Big Fast Data World," Software AG, Innovation World, Oct. 9, 2013, pp. 1-30.

Nice.com—Proactive Security, Situation Management and IP-Based Surveillance, retrieved Oct. 14, 2014. http://www.nice.com/transportation/airports.

U.S. Appl. No. 14/457,365, filed Aug. 12, 2014, Gareth Smith.

U.S. Appl. No. 14/332,421, filed Jul. 16, 2014, Gareth Smith.

Beggs, Lance, "Biofeedback for Trader Psychology", Jun. 8, 2012, Your Trading Coach, 14 pages.

Griffiths, Sarah, "Cars could soon monitor our Emotions: Device reads facial expressions to prevent road rage", Mar. 14, 2014, Daily Mail via dailymail.com, 6 pages.

Fenton-O'Creevy, Mark et al., "Emotion Regulation and Trader Performance", May 2011, presented at 15th conference of the European Association of Work and Organizational Psychology, Maastricht, The Netherlands, 16 pages.

Fenton-O'Creevy, Mark et al., "Thinking, feeling and deciding: The influence of emotions on the decision making and performance of traders", Published online Jul. 26, 2010 in Wiley Online Library, Journal of Organizational Behavior, J. Organiz. Behav. 32, 1044-1061 (2011), 18 pages.

Lo, Andrew W. et al., "The Psychophysiology of Real-Time Financial Risk Processing", Copyright 2001, NBER Working Paper Series: Working Paper 8505, 34 pages.

Khazan, Olga, "This App Reads Your Emotions on Your Face", Jan. 15, 2014, The Atlantic, 7 pages.

* cited by examiner

LARGE VENUE SURVEILLANCE AND REACTION SYSTEMS AND METHODS USING DYNAMICALLY ANALYZED EMOTIONAL INPUT

CROSS-REFERENCE TO RELATED APPLICATION

This application is a continuation of application Ser. No. 14/515,663 filed Oct. 16, 2014, the entire content of which is hereby incorporated by reference in this application.

TECHNICAL FIELD

Certain example embodiments described herein relate to large venue surveillance and reaction systems and/or methods. More particularly, certain example embodiments described herein relate to large venue surveillance and reaction systems and/or methods that take into account both subjective emotional attributes of persons having relations to the large venues, and objective measures such as, for example, actual or expected wait times, current staffing levels, numbers of customers to be serviced, etc. The analysis may be used in certain example embodiments to help improve customer satisfaction at the large venue.

BACKGROUND AND SUMMARY

Today, the increasingly international nature of business, rising levels of disposable income, and other factors, have led to increased air travel. For instance, people oftentimes take regular domestic and/or international flights for tourism, to visit friends/family, to conduct business, etc. Indeed, the proliferation of airline loyalty programs suggests that frequent flying (e.g., one or more times per month) is commonplace for many people today.

Yet almost anyone who travels by air is familiar with the frustrating experience of having to stand in multiple lines at various points in an airport. The seemingly wasted time waiting in lines before reaching a boarding area reduces individuals' abilities to enjoy themselves while traveling. Indeed, numerous activities prevalent at airports cannot be enjoyed at all. Consider, for example, that long delay inhibit the ability to relax at or near a gate before boarding, sip on a coffee while reading a newspaper, drink an alcoholic beverage while watching a news broadcast or sporting event in a bar, make a last call to a loved one, check email or otherwise conduct business by telephone before going offline for the duration of the flight, shop for clothes or gifts or pick up electronics (e.g., a spare set of batteries or headphones so as to be able to enjoy a few films on the plane), etc.

Certain example embodiments seek to address these and/or other related issues. For instance, certain example embodiments help address the issue of airport crowd congestion, so as to produce a more "even flow" (e.g., an improved or optimized through-flow) within the process of arriving at an airport and boarding an airplane and, as such, reduce the time spent waiting in lines. By doing so, operational efficiencies can be gained, customer (passenger) satisfaction can be enhanced, and airport revenues can be increased.

Certain example embodiments involve determining a customer's emotional status by means of facial recognition (based on data gathered from video cameras) and social media (e.g., via sentiment analysis), etc. Certain example embodiments also help determine whether real-time action(s) would be helpful in preventing, reducing the likelihood of, or resolving, existing problems and/or problems that arise during the through-flow of passengers at an airport. By taking actions when appropriate, the airport authority, airline operators, proprietors within the airport, and others can benefit, e.g., from improved overall customer perception of travel-related services or products. Certain example embodiments thus provide a more holistic Customer Experience Management (CEM or CXM) solution.

It will be appreciated that the benefits to an airport, airline, proprietors, etc., associated with determining these operational reactions in real-time and thereby improving CEM can be equally applicable in other environments. For example, railway stations, amusement parks, and/or other areas where crowds are gathered can benefit from the example techniques set forth herein.

One aspect of certain example embodiments relates to enhancing the customer experience at a venue such that doing so becomes an input that can influence actions taken along with other known mechanisms. In addition, it can also provide real-time dynamic feedback as to the results of subsequent actions taken to deal with the problems. This approach advantageously in certain example instances can help tie together individual monitoring mechanisms for feedback and possible further actions. It is in the analysis of the behavior rather than the more simple use of camera technology to measure queues/flow that helps achieve the satisfaction and dynamic reaction beneficial for coordinating various individual monitoring mechanisms to provide a complete solution, in certain example embodiments.

Another aspect of certain example embodiments relates to using video surveillance in order to optimize or improve the operational efficiency and speed of processing passengers at a large venue. In addition, the venue's video surveillance data may be used for security purposes.

Still another aspect of certain example embodiments relates to enabling a venue authority (e.g., an airport authority) or other authorized user define "need for action" algorithms, which may take into account an extensible set of parameters, custom weights, etc., that help identify (and potentially rank in order of severity) perceivable problems. In certain example embodiments, authorized users may specify problem types, optional respective levels of severity, etc., and such problems may be defined in terms of emotional sentiment, etc. Additionally, or in the alternative, recommended resolutions may be defined in a similar way. For instance, recommended solutions to problems may be ranked, e.g., in order of impact, number of issues they address and solve partially or completely, etc. Certain example embodiments may make a determination as to what problems to resolve and how to resolve them (e.g., if multiple possible problems are present), e.g., based on a ranking. Wait times may be specified to confirm whether there is an effect in an implemented action plan. In certain example embodiments, it may be possible to generate longer-range (e.g., daily, weekly, seasonal, etc.) staffing plans, accommodative actions, etc.

In certain example embodiments, there is provided an information processing system, comprising processing resources including at least one processor. The system further includes a first interface over which quantified representations of inferred emotional states of one or more individuals are electronically receivable. The processing resources are configured to at least: dynamically perform a set of first pre-programmed scenarios in real-time as events continue to stream into the system via the first interface to determine whether an incident might be occurring and/or might have occurred, each said first scenario being implemented as a logic sequence that takes into account at least an aspect of a representation of an inferred emotional state; and dynamically determine an action to be taken, in response to a determination that a given incident might be occurring and/or might have occurred, the action being selected as an appropriate response for the given incident.

In certain example embodiments, a method of monitoring a venue of interest is provided. The method includes: receiving, over a first electronic interface, quantified representations of inferred emotional states of one or more individuals; dynamically performing a set of pre-programmed scenarios in real-time as events continue to stream in over the first electronic interface to determine whether an incident might be occurring and/or might have occurred, each said first scenario being implemented as a logic sequence that takes into account at least an aspect of a representation of an inferred emotional state; dynamically determining an action to be taken, in response to a determination that a given incident might be occurring and/or might have occurred, the action being selected as an appropriate response for the given incident; and issuing a message to cause the action to be taken.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF CERTAIN EXAMPLE EMBODIMENTS

Figure 1:
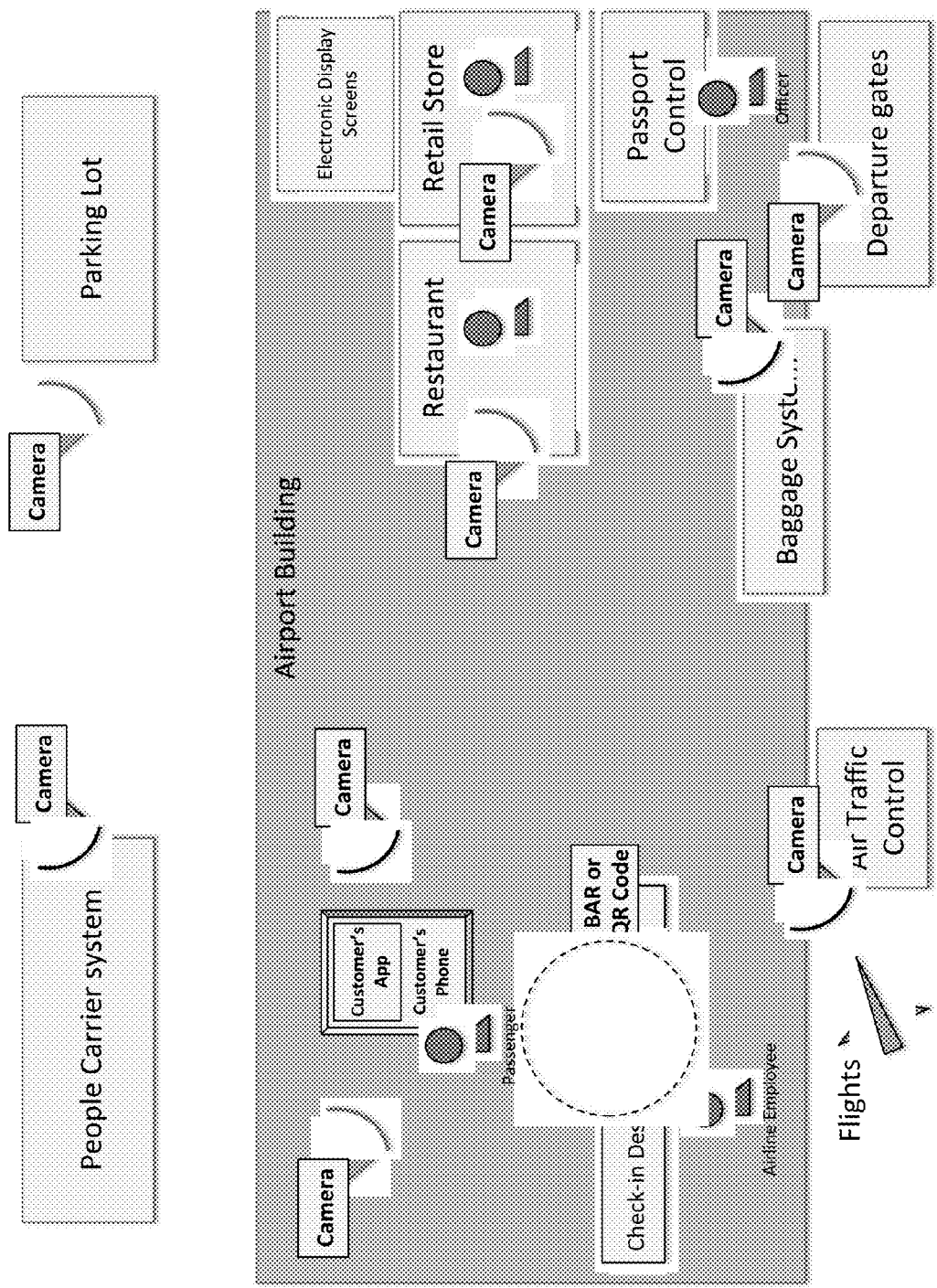
FIG. 1 is an example airport layout that includes components that may be used in connection with certain example embodiments.

Certain example embodiments involve taking input from a multitude of cameras within a large venue (e.g., an airport) and analyzing people's emotional states, reactions to various situations, etc. By feeding this information as input into a processing engine (e.g., an event-based processing engine such as a complex event processing (CEP) engine or the like), it is possible to combine this real-time quantified emotional feed with other established input, e.g., to enhance a customer's experience at and increase their satisfaction with the venue. As an example, this technique can be used to smooth the flow through the large venue, possibly with cost savings (e.g., realized through more strategic resource deployment), increased revenue for the venue's operators (e.g., for shops who benefit from increased customer browse time that otherwise would be spent with those customers in line), etc. It also becomes possible in certain example embodiments to improve reaction times for resolving issues, thereby further enhancing the customers' satisfaction levels.

An aspect of certain example embodiments relates to providing a more holistic view of all participants at a venue for their respective "lifecycles" at the venue. For instance, in the airport example, certain example embodiments provide a holistic view of all passengers within the complete passenger lifecycle within the airport (e.g., from arriving at airport, checking in, passing through passport and/or other security checks, making inter-terminal transfers, walking through restaurants and shopping areas, boarding, etc.). By achieving this holistic view, certain example embodiments facilitate the active reduction of wait times related to staffing issues and system and transport bottlenecks, thereby freeing up passengers' time, which may be spent at leisure (e.g., in restaurants and shops at an airport). Doing so may be advantageous in terms of leading to improvements in operational efficiencies at the venue, increasing customer satisfaction levels, generating higher revenues at the leisure locations, etc.

Another aspect of certain example embodiments relates to using emotional analysis to improve customer experiences at a venue, e.g., in determining whether there is a need for action, what action should be taken, etc. User-definable algorithms may take into account this subjective information, providing a reasoned approach for determining whether to take action and, if so, what action to take. Algorithms may be defined to take into account an extensible set of parameters, custom weights for the parameters, etc. In addition, or in the alternative, more objective measures may be incorporated into these and/or other algorithms. More objective data may include, for example, average time spent at a check-in kiosk (which could be measured by the kiosks' GUIs), average time from ticket issuance at a kiosk to boarding, percentage of passengers who print boarding passes at home, scheduled vs. actual time of departure, accuracy of flight delay time estimates, etc. Algorithms may additionally or alternatively take into account flags such as, for example, flags indicative of a severe weather shutdown of all outgoing flights, a security issue existing in Terminal X, a fire at gates Y-Z, etc.

As alluded to above, the example techniques described herein may be applied to a variety of different scenarios. However, for ease of explanation, an airport example will be discussed in greater detail below. Within a typical airport ecosystem, there are a number of stakeholders including, for example, passengers (customers), airlines, airport operations, airport vendors, security staff, and others.

With an improved (e.g., faster) through-flow of passenger traffic, there are a number of benefits to these stakeholders. Passengers' experiences can be improved from lower waiting times, which can enable more time to be spent working, resting, shopping, eating, etc. Airlines can benefit because staffing levels can be better managed (e.g., under- and over-staffing situations can be mitigated), they can be perceived as providing better customer service, they may not need to manage escalation scenarios or issues with passenger delays, etc. Airport operation also can benefit from improved staff management, being able to handle an increasing number of passengers in a more efficient manner, providing a better infrastructure for all stakeholders, etc. Airport vendors can benefit from decreased waiting times, which may enable passengers to spend more time in shopping and restaurant areas, likely leading to additional revenues, etc. Security staff can benefit from better staff management, fewer bottlenecks that cause less crowding/gathering that potentially can put added pressure on security staff which, in turn, can lead to distractions, making security more challenging and security lapses possibly more likely, etc. Air traffic control can benefit, as airline operators may hold up flights less regularly (e.g., because they are waiting for "status" passengers less frequently), etc.

In this vein, the example through-flow improvement techniques set forth herein can be particularly advantageous for customers at the venue (e.g., passengers at an airport) and vendors at the venue (e.g., airport vendors). The former may gain a better customer experience, and the latter may increase revenue and lower operational costs. In the airport context, for example, once passengers have proceeded through check-in and security areas, they reach gate areas where they wait until boarding. Once there, there are a number of ways a passenger is likely to spend money (including, for example, at duty free shops, at bookstores and press stores, convenience stores, travel value stores, fashion/accessory stores, gift/souvenir stores, technology/entertainment stores, jewelry stores, at restaurants, on services such as massage or shoe-shine services, with travel agencies, etc.). It often is the case that the more time passengers have available in such areas, the more likely they are to be able to spend and to actually spend.

It also is believed that if passengers board a plane having already had a good experience at their departure airports, then airlines oftentimes are more able to continue to enhance their experiences while they are on-board the aircraft. A total end-to-end experience for the passenger may be provided, e.g., if the experience at the arrival airport, target hotel, etc., are improved, in like ways. It will be appreciated that the same or similar customer care capabilities can be employed throughout every stage of an individual's journey in some instances.

Commercial feasibility can be demonstrated in connection with an airport example that helps speed up passenger through-flow. The following assumptions are made for the purpose of this example demonstration:

A medium-sized airport is located in an area where the appetite for a new technological solution may be relatively high such as, for example, the San Francisco Airport.

The Passenger On-Premises Process (POPP), which may be thought of as the process starting with the arrival of the passenger at airport premises (e.g., at the airport parking lot, rental car return, passenger drop-off area, in arrivals (if in transit), etc.), can be reduced by 10 minutes.

Ten minutes is used as an assumption for the calculation to err on the side of caution. During busy periods, wait times could be cut more drastically, and perhaps more than halved. In extreme cases this could lead to reducing waiting time of more than 20-30 minutes if main waiting areas are included. Such main waiting areas are assumed to involve areas where people wait for a shuttle from a parking lot or rental car return to a desired terminal, wait at check-in for a boarding pass and to submit luggage, wait to proceed through passport control and security screening, and wait to board at the gate.

There would be significant operational efficiency gains from the impact of drastic reduction in wait times.

Customer experience and satisfaction levels could be drastically improved. The customer's subjective perception of spending much less time waiting and more time relaxing or being productive is likely to be exponential.

As a result, decreasing wait-times by 25-50% (or 10-20 minutes) could lead to increased customer satisfaction of up to 75%.

Average Airport Passenger Revenue (AAPR) can be increased by $12. This is likely to be an average of a passenger buying a newspaper and a coffee, or sitting down for a beer and a hamburger. In rarer/more extreme cases, passengers may spend nothing or buy electronic goods, gifts, or clothing for $100 or more. It will be appreciated that AAPR does not include flight-related costs such as, for example, tickets or baggage fees.

Other financial gains from operational (e.g., staffing) efficiencies are ignored.

The buyer of the technology underlying the solution is willing to spend 0.1% of incremental revenue.

In this "worst case" scenario, using the annual passenger data from 2013, annual revenue at San Francisco Airport can be increased by more than $500 million (e.g., approximately 45 million passengers×$12/passenger=approximately $540 million). Using these worst case scenario assumptions (considered "worst case" because savings from staffing efficiencies are ignored), a license fee for the technology described herein is very reasonable, particularly given the significant increase in revenue. Furthermore, in addition to operational efficiencies (e.g., staff resourcing, etc.) and revenue enhancement, customer experience improvements also can be realized. Not only can revenue be increased by providing passengers with more (and sometimes any) time in the boarding area where shopping, restaurants, and services are offered, but there oftentimes is a higher propensity to purchase more when a passenger (or any customer) is in a more positive, relaxed, and happier frame of mind.

Example Implementation and Scenarios

As alluded to above, certain example embodiments collect data from various sources. In the airport example, information may be gathered from the time at which a passenger arrives at the airport premises and proceeds through an airport, up to the time of boarding. Sources may include, for example, video-related data and social media related data. For instance, video cameras positioned at various points of congestion at an airport (e.g., check-in, security, etc.) to measure crowd volumes, associated luggage, etc., may be used. Furthermore, data from the video cameras may be used to help identify facial expressions (e.g., via facial recognition techniques) of individuals in the area under surveillance in order to measure their sentiment, e.g., on individual and collective bases. Social media (e.g., Twitter, Facebook, etc.) and an airport's own website also may provide an indication of sentiment, etc.

FIG. 1 is an example airport layout that includes components that may be used in connection with certain example embodiments. As with a typical airport, there is a parking lot and an airport building. A people carrier system (e.g., including busses, trams, monorails, and/or the like) help convey people among and/or between the parking lot, the airport building, terminals, and/or the like. Air traffic control is provided to monitor incoming and outgoing flights, adjust schedules, etc. Baggage is conveyed through a baggage system. Airline employees staff a check-in desk. Passengers may check in and perform other operations using their smart phones, and bar codes, QR codes, and/or the like, may be used for this purpose. Security may be provided at passport control and/or other like checkpoints, prior to allowing passengers to reach the departure gates. Electronic display screens may display flight status information, advertisements, security announcements, etc. Restaurants, retail stores, and/or the like, also are provided throughout the airport building.

As can be seen from FIG. 1, indoor location tracking technology is provided (e.g., through iBeacon transceiver technology or the like). Scanning bar codes, QR codes, etc., can also provide individualized tracking, as well as a more course count of people moving through various locations at the airport (e.g., check-in, security, passport control, etc.). Surveillance cameras are located throughout the airport building, in the parking lot, in the people carrier system, etc., and the data from the cameras may be used to feed visual analysis systems. Social media from the passengers' smart phone also may be fed into the analysis systems.

Figure 2:
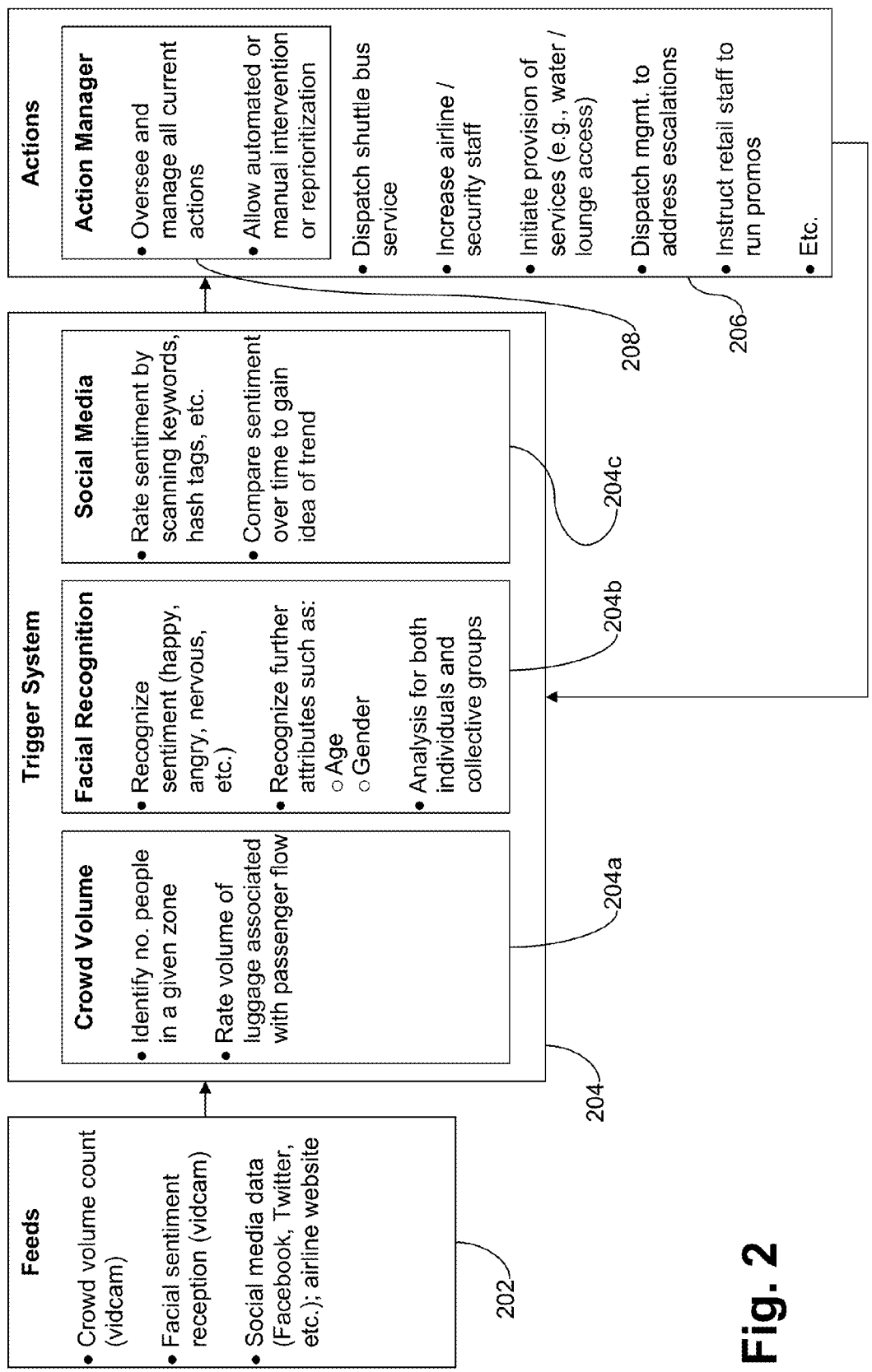
FIG. 2 is a schematic diagram of feeds, triggers, and actions working together in connection with certain example embodiments.

Based on these and/or other feeds, operational data is captured, and a processing system (e.g., an event-based processing system such as a CEP engine or the like) maps the operational data with the data provided by the feeds and filters the results according to a rating system. Under certain circumstances (e.g., crowd volumes at Zone A are higher than X but staff levels at Zone A check-in are lower than Y), the rating system instigates or triggers an appropriate action to remedy or mitigate the problems (e.g., long lines developing) in some way. FIG. 2 is a schematic diagram of such feeds 202, triggers 204, and actions 206 working together in connection with certain example embodiments.

As alluded to above, and as becomes clearer from FIG. 2, feeds 202 are sources of data from devices, people, sensors, cameras, vehicles, etc., gathered from across a venue (e.g., an airport, stadium, station, museum, or other venue) or other source. Feed information may also include social media input, website postings, emails, connections from external systems (e.g., human resources management systems that indicate how many and which employees are or could be on-duty, etc.). Feeds 202 may include real-time and/or static sources of data that are used by triggers in the trigger system 204 to look for patterns. Thus, feeds may come from a connection to a social media source that is scanned in a relevant way (e.g., scanning of airport-specific accounts, a website such as Trip Advisor relevant to travel, airline account postings, restaurant and retailers account postings, etc.); location and speed of vehicles (e.g., gathered directly from the vehicles using a GPS device or the like or indirectly via cameras or manual reports); weather conditions (e.g., obtained from the National Weather Service or some other outside provider, as reported locally, etc.); people (e.g., actual or inferred gender, age, weight, height, etc.), flight information (e.g., based on internal data, a feed from the FAA or other official source, etc.), and/or the like. Feeds may be received over a number of network interfaces, e.g., such that data from disparate of remote and/or local data sources can be received. This may include, for example, using Twitter or Facebook REST APIs; using MQTT to receive real-time data of the location, velocity, and other metrics surrounding the people carrier vehicles; etc. In brief, any suitable means for electronically receiving relevant data from internal and/or external data sources may be used in certain example embodiments.

Triggers in the trigger system 204 are simple or complex analytics and triggering patterns that generate an action when certain operational criteria are detected or identified. In other words, when information provided by the feed(s) correlates with operational data, the trigger causes an action to be taken. Example triggers are set forth below. It will be appreciated from FIG. 2, however, that the triggering patterns may relate some of all of the data associated with crowd volumes 204a, facial recognition detection and correspondingly inferred sentiment 204b, social media inputs and correspondingly inferred sentiment 204c, etc.

Actions 206 are an extensible set of activities that are invoked by the trigger system 204. The actions 206 include an action manager 208, which can actively manage the lifecycle of actions and aspects of automated or manual control (e.g., reprioritization, intervention, etc.) over live or queued actions. Based on a trigger, certain actions may be instigated to remedy or mitigate potential problems. They can be operational (e.g., increase staffing levels), marketing related (e.g., provided complimentary drink samples), etc. Thus, actions may be simple or complex and may involve manual and/or automatic activities that are executed as a result of a trigger identifying a set of patterns. Once a trigger initiates an action, the action may be registered within the action manager 208 (e.g., in a suitable store thereof).

In certain example embodiments, actions may include metadata and a body or payload. The metadata may provide a high-level (or generic) descriptor of the action that the action manager 208 can use, e.g., as a reference. The action body may define the set of instructions that the specific action is designed to take. The action body may use a mix of data from a variety of sources such as, for example, internal static values (e.g., those defined when the action was created); operational parameters; values from the live feeds themselves; values from the components within the trigger module; values from any of the scenarios within the trigger module (discussed in greater detail below), and/or the like.

The metadata may include some or all of the following and/or other fields/field descriptions:

| Field | Field Description |
| --- | --- |
| Name | A name, description, and/or other descriptive texts |
| Type | A classification of an action type |
| Zone | A classification of an action zone |
| Severity | A classification of action Severity (e.g., numerical or other priority code) |
| End | Definition of when the action has ended |
| Stop | Method of stopping an action |

The action manager 208 can use the metadata, e.g., to apply global generic, policies (e.g., in the form of rules) across actions to determine when a given action is deemed to be complete, needs to be reprioritized, edited, removed entirely, etc. For instance, it can automatically stop a specific, currently active action, e.g., based on the following example rule:
STOP
→When the number of people within Zone X is less than 10

Once the action manager 208 receives this action, it will invoke the action body and will then monitor the Zone X population (using the defined feeds) and will stop that action when the population count drops below 10.

As another example, the action manager 208 could additionally or alternatively automatically stop one action when a new action of the same type and zone but greater severity has been received. The following example rule may be used in this regard:
-->On receipt of a new action
   -->For all active actions of the same type and zone with a lower priority than this new action then:
      -->stop those actions and invoke the new action Using this inbuilt capability of the action manager 208, the management of actions can be automated and dynamic where they are overridden and/or reprioritized. For example, if an arriving plane or its crew is delayed, it might not be advantageous to speed up the processing of passengers to the boarding area only to find that they cannot board the plane. As another example, assume that the thermostat on the air conditioning system is faulty and is showing a high airport temperature by mistake. If this is the case, the action "dispatch airport catering staff to offer chilled water" to passengers lining up in an area where the temperature is fine can be disabled. In certain example embodiments, actions can be held in a priority queue for at least a threshold amount of time, unless they are deemed so severe that they must be handled immediately. Holding elements in a priority queue enables a sort of implicit reprioritization and advantageous use of limited resources, as higher priority elements are more likely to be dequeued, e.g., at a regular dequeuing interval. Events can have time-to-live values and can be removed from the queue if their corresponding time-to-live values have been exceeded, thereby potentially enabling a time period for a situation to resolve itself, helping to ensure that no longer relevant problems are properly ignored, etc.

The action manager 208 may in certain example embodiments be configured to calculate metrics for use in the management of actions. The metrics to be used may be defined within the action. This allows the action to, for example, stop when the sum of people seen within a given zone exceeds a given value. It can also calculate a moving average of a given value over a given timeframe (for example, when the current happiness sentiment (derived from the visual analysis system) of the people in a given zone is greater than the 10 minute moving average of happiness for passengers in that zone). In certain example embodiments, actions may refer to external processing logic bundles, e.g., to make more complicated calculations easier to reference, enable code reuse, and provide for a more extensible system.

Action settings can be manually altered, e.g., a higher priority may be assigned to a given action, the attributes of a chosen action may be modified (e.g., if the number of recommended airline agents for a crowd level of more than 70 is six but a backlog continues to occur, the parameter can be adjusted to seven agents), etc. In certain example embodiments, a learning system may be implemented to help automatically adjust settings. Similar to the above, actions may refer to external parameters, e.g., to read/set global parameters and provide for a more extensible system, etc.

Figure 3:
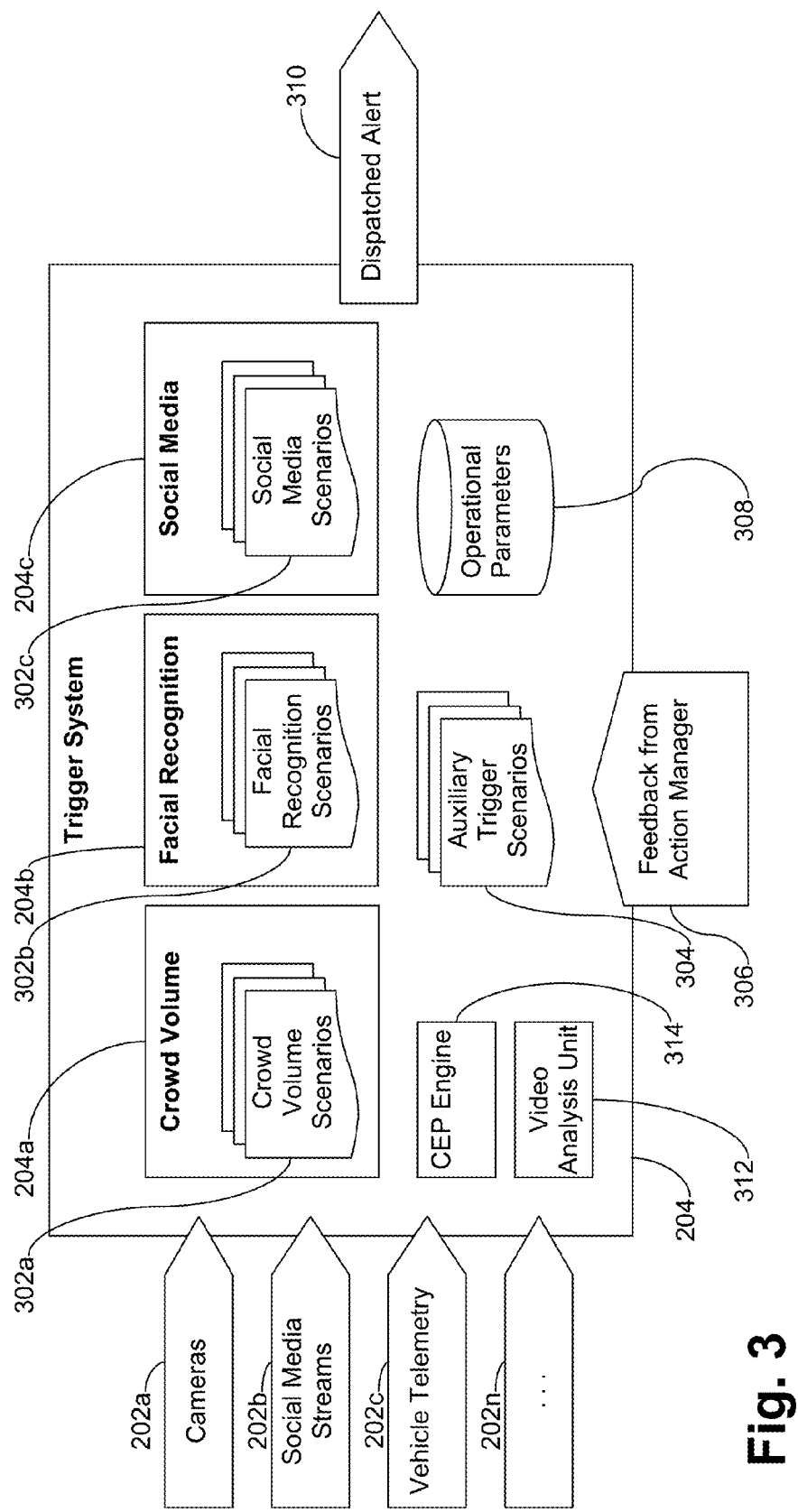
FIG. 3 is schematic view of a trigger system that may be used in connection with certain example embodiments.

The physical assets used in certain example embodiments (e.g., video surveillance cameras, vehicle telemetry, social media websites, etc.) are understood by those skilled in the art and tangible. In certain example embodiments, the data from the sources is analyzed, processed, and managed so as to generate or trigger a recommended action. In this regard, FIG. 3 is a schematic view of a trigger system 204 that may be used in connection with certain example embodiments.

Feeds 202a-202n provide data to the system. In general, and as noted above, this data is classified as relating to patterns involving crowd volume related data 204a, facial recognition related data 204b, and social media related data 204c.

Crowd volume related data patterns 204a in the airport example may refer to an operational impact based on of a certain number of passengers arriving at a given area in an airport. The pattern may use data based on video camera feeds, e.g., to identify the number of people within any defined zone. The number may be quantified or estimated (e.g., in accordance with thresholds such as high, medium, and low), etc. Crowd volume scenarios 302a are trigger scenarios that relate to aspects involving crowd volume and are discussed in greater detail below.

Facial recognition related data patterns 204b may involve the interpretation of facial expressions (from which customer sentiment (e.g., happy, sad, anxious, etc.) may be inferred) and other physical attributes of individuals (e.g., age, gender, etc.). Facial recognition scenarios 302b trigger scenarios that relate to aspects around facial and physical person attributes and are described in greater detail below. Certain example embodiments express these attributes for both individuals and the collective group visible to the camera (or cameras). This advantageously allows, for example, for the ability to highlight any exceptions from the current norm (e.g., when one individual is extremely unhappy but the rest of crowd is generally very happy, possibly indicating a security situation or something worth investigating). This also advantageously allows for the construction of "normal" emotional conditions for times of day, days of the week, specific calendar events (e.g., holiday travel, business travel days, national holidays, etc.). Normal and/or historic levels can further be used to look for deviations in the current, real-time context, e.g., to highlight possible problems, opportunities, etc.

In this regard, in certain example embodiments, video feeds may be processed a video analysis unit 312 that includes at least one processor and a memory and attempts to interpret each of the video feeds and generate a stream of information that seeks to quantify more qualitative (e.g., emotionally characterized) information from the video. The more qualitative data, once quantified, may be used to help describe an inferred emotional state of the person(s) being monitored. This may include indications of emotions, gesticulations, identification, and/or the like, which may be processed at a binary or more granular (e.g., fuzzy) level. Facial recognition, emotion sensing, and/or other software and/or systems may be used in this regard, and consideration may be given to facial expressions, gesticulations, etc. Example emotions graded on a fuzzy scale of 0-100% may include, for instance:

Happy: A percentage that describes how happy a person is (e.g., where 0% is an expressionless or a sad expression, and where 100% is a full smile);

Sad: A percentage that describes how sad a person is (e.g., where "sad" is the inverse of or otherwise related to "happy"; where 0% is a full smile and 100% is tearing, wet, or red eyes; etc);

Angry: A percentage that describes how angry a person is (e.g., based on skin tone and/or color, clenching of the jaw, throbbing of veins in the forehead, clenching of fists, throwing one's hands in the air, etc.);

Shocked: A percentage that describes how shocked a person is (e.g., based on facial expressions); and/or Agitated: A percentage that describes how agitated a person is (e.g., based on the volatility of a person's movement within a defined area, whether the person paces, whether person sits and stands, frequently, etc.).

As will become clearer from the more detailed description below, some scenarios may take into account aggregated emotional states that combine one or more of the raw feeds from the visual analysis system. Moreover, certain example embodiments may perform moving average calculations, e.g., to derive dynamic "baseline" and/or "gradient" values for such emotional data. In this sense, a baseline may be thought of as a medium-to-long term moving average calculation that may be used to denote a "normal" state or value for any quantitative value, and a gradient may be thought of as a measure of the rate by which a given value is changing (e.g., positive for increasing values, and negative for decreasing values). The baseline and/or gradient values may in some instances make it possible to compare the normal states and the rate of change in these states, e.g., for the average person, a collection of people within a given area of a venue, a collection of people within a given venue as a whole, a collection of people across like areas of different venues, a collection of people across different venues, a collection of individuals having certain predefined characteristics (e.g., demographic characteristics such as, for example, age, gender, experience, time of travel, travel season, etc.), and/or others. For instance, minor delays with an "always on time" carrier may be treated as more significant and thus potentially more worthy of proactive response than more severe delays with a carrier that is perceived to be late much of the time. Similarly, major delays with an airport whose flights are always delayed (e.g., the Atlanta-Hartsfield Airport) may be seen as less significant.

Aggregated states may include "anxiety" and "negativity" for example. Anxiety may, for example, be considered an aggregation of sadness, agitation, anger, and shock. Weights may be attached to or otherwise associated with these factors such that, for example, the anxiety aggregation is calculated as:

Anxiety=
[Sadness*1.0*Agitated*1.25*Anger*0.75*Shock*0.5]/3.5

Similarly, negativity may be considered an aggregation of sadness, agitation, anger, and shock, but with different weights as compared to anxiety. In this regard, the negativity aggregation may be calculated as:

Negativity=
[Sadness*1.5*Agitated*0.25*Anger*1.5*Shock*0.5]/3.75

Common analytics measures, such as baselines (which may be percentages from 0% to 100%) and gradients (which may be percentages from −100% to +100%, where 0% is a flat line) for each metric may be set over a defined time window. The time windows may be set by default in certain example embodiments (e.g., to 15 minutes) and/or customized for a particular context (e.g., by an authorized context definer). Thus, the "baseline(happy)" value may be defined as the 15-minute moving average of the happy value, and the "gradient(happy)" value may be defined as the gradient of the 15-minute moving average of the happy value.

Social media related data patterns 204c may involve actionable insight into the meaning of certain words and phrases (and/or other forms of media such as images, sounds, etc.) used in social media outlets and websites such as Twitter, Facebook, Trip Advisor, etc. Social media scenarios 302c are trigger scenarios that relate to aspects around social media use cases and are described in greater detail below. It thus will be appreciated that social media posts, message content, etc., may be used to infer emotional attributes that may inform certain example embodiments.

For instance, the tone of messages may be rated automatically or manually, e.g., using binary and/or fuzzy ratings similar to as described above. Furthermore, in certain example embodiments, the mere fact that a message has been posted, a call has been made to a customer service representative, and/or the like, may be taken into account, e.g., to help uncover further patterns in sentiment.

The three patterns 204a-204c described above provide both analytical capabilities and a host of trigger scenarios that can generate alerts from patterns detected within those analytics. This allows for very rich types of trigger scenarios that can blend data sources across different types of analytics. In addition, auxiliary trigger scenarios 304 may be hosted within the trigger system 204 and may have access to data feeds that include, for example: raw incoming data (e.g., from cameras, social media, etc.), analytics contained within the three main patterns 204a-204c (social media sentiment, number of people within a zone, etc.), status and results of the scenarios contained within the three main patterns 204a-204c, etc.

When alerts are generated by elements within the trigger system 204, they are continually managed by the action manager 208 that is hosted within the action component 206. The action manager 208 may process, stop, override, reprioritize, and/or take other actions with respect to the working set of actions. Changes to these actions may be passed back to the trigger system 204. This "feedback loop" then becomes an input stream (feedback from action manager 306) that is available to the scenarios within the trigger system 204. This may allow the historic activity of previous alerts to be used to trigger new types of scenarios, etc.

Each of the scenarios can optionally expose a set of configurable parameters. These configurable parameters can be changed by an internal component (e.g., a scenario), an external source (an authorized user, an external computer application via a programmable API), etc., to provide another source of consistent data. This may, for example, allow for simple "on-the-fly" manipulation of the behavior of the system. As an example, the weights assigned to, and/or definitions of, aggregated emotional states may be parameterized. Such parameters thus may be stored in a non-transitory computer readable storage medium, and they may be associated with one or more scenarios, as appropriate.

As will be appreciated from the above, alerts 310 may be dispatched, e.g., once generated by one of the scenarios within the trigger system 204.

An event-based system would be desirable in processing the high volumes of event-based data received from the wide range of sources and in responding thereto (e.g., in real-time). Certain example embodiments may use a database approach of receiving data, storing it in a data store (e.g., a database) and, at some interval later, processing or querying the set of stored data. The interval in this two-step "load then query" process may, however, sometimes be longer than the time required to respond, e.g., in the context of a security breach, long lines developing, a flight delay involving large aircraft, etc. Thus, more traditional database approaches may be appropriate for the processing of some, but not all, of the incoming data, at least in certain example embodiments.

In contrast with more traditional database approaches, the event-based approach of certain example embodiments may execute continually running filters for specific event patterns, e.g., through the use of complex event processing (CEP) queries or the like. Data thus may be more immediately matched against a filter with little-to-no additional processing latency, e.g., as the data in essence is "flooded" over the scenarios/patterns in the event-based system. The use of an event-based system such as a CEP system or the like thus advantageously provides for massive performance scalability and low latency that is compatible with the example scenarios potentially involved herein. In certain example embodiments, and as suggested above, less critical information (e.g., long-term travel trends, etc.) may be processed using a more conventional database approach, whereas more rapidly changing emotional data, social media sentiment, etc., may be fed through a CEP system apart from or together with output from the database queries.

One or more event busses may facilitate the receipt of events corresponding to elements in the respective feeds, e.g., for subsequent processing by an event-based processing engine. The input feed(s) may be merged and/or considered with operational parameters 308. Furthermore, in the FIG. 3 example, a CEP engine 314 processes the incoming events received over the feeds in accordance with the scenarios. That is, merged data is applied to and/or considered with the relevant scenarios.

As alluded to above, if an incident is detected based on the scenarios, it may be added to a working queue of pending incidents for potential follow-up. The detected incident also may be written to an incident log. The CEP engine 314 and/or another processor may calculate aggregated emotional data, baseline and/or gradient information, etc., for use in connection with the evaluation of the scenarios. A database or other data store may associate individuals with their corresponding emotional data such as, for example, current scores, baseline and/or gradient data, historical scores, etc. Similarly, a database or other data store may aggregate such data for groups of individuals, as appropriate. In certain example embodiments this data may be updated at predefined intervals, upon the receipt of a new event over an interface, when a scenario is being run, etc. In certain example embodiments, this information may be calculated in real-time and on an as-needed basis.

The working queue may be implemented as a first-in-first-out (FIFO) queue in certain example embodiments and, as indicated above, the working queue may be implemented as a priority queue in certain other example embodiments. With respect to the latter, for example, the scenarios may assign scores to the incidents. The scores may be based on potential degree of severity, likelihood of there actually being a problem, etc. A straightforward calculation involving the multiplication of severity and likelihood is one example scoring mechanism, although others are of course possible in different example implementations. A scoring mechanism such as this may help the action manager 208 prioritize between higher likelihood incidents with low potential impacts (e.g., a long wait at customs when a Boeing 777 arrives) and lower likelihood incidents with high potential impacts (e.g., a security breach). The scoring may in certain example embodiments help to provide a normalized means of comparing potential incidents. Certain incidents may have a score that is sufficiently low as to allow them to be processed "off-line" (e.g., after the fact). The threshold for such scores may be defined by an authorized user. The scoring mechanism may be specified on a scenario-by-scenario basis, for a collection of scenarios, on a system-wide basis, etc. In certain example embodiments, incidents in a pending queue may be maintained for later analysis of scenarios, e.g., such that the appearance of a significant number of number of low impact alerts (which individually might not be sufficient to trigger a significant action) over a short time period is treated as sufficient to trigger some further action.

As indicated above, the scenarios may in some instances assign timestamps or "time-to-live" values to incidents. This may be useful, for example, to help weed out past incidents that have been resolved in one form or another. The action manager 208 may assist in assessing the time-to-live values and curating the working queue, as appropriate. For instance, the action manager 208 may remove expired indictments based on comparisons between their time-to-live values and a current time.

In certain example embodiments, the action manager 208 may reorder the queue as scores are updated, e.g., as more information becomes available, as scenarios are potentially re-run on data, as time-to-live values near their expiry, etc. For instance, if a first incident is flagged for follow-up, and other incidents are determined to be related to it, those related incidents might have their scores updated by the CEP engine 314 or the like. The action manager 208 thus may reorder the queue, as appropriate.

The action manager 208 also may work with the CEP engine 314 to apply scenarios to pending incidents as appropriate. For instance, the action manager 208 may de-queue the top pending incident and allow it to be subjected to further scenarios that determine whether an action actually should be taken. A second working queue and/or a second queue analyzer may be provided to aid in these and/or other respects. Information generated by these scenarios also may be logged, e.g., in association with the related incident to which the given action scenario is being applied.

In certain example embodiments, the scenarios may be re-run and/or the working queue may be re-ordered via a CEP query that is executed each time a new incident is received, a feed update is received, and an internal timer event is triggered, etc.

As mentioned above, and as further elaborated on below, in certain example embodiments, pending incidents may be held within the working queue for at least a predetermined minimum amount of time, e.g., unless a given received incident is to be further processed immediately (e.g., has a high score above a predefined threshold), in which case the incident may bypass the queue and be forwarded on for further processing and action as appropriate, etc.

Although not shown in FIG. 3, certain example embodiments may include a secure portal through which authorized individuals, regulators, and/or others may access the system.

A set of example scenarios that may exist within the trigger system 204 will now be provided. It will, however, be appreciated that some or all of the following and/or other scenarios may be used in different example embodiments.

Example Crowd Volume Scenarios

Figure 4:
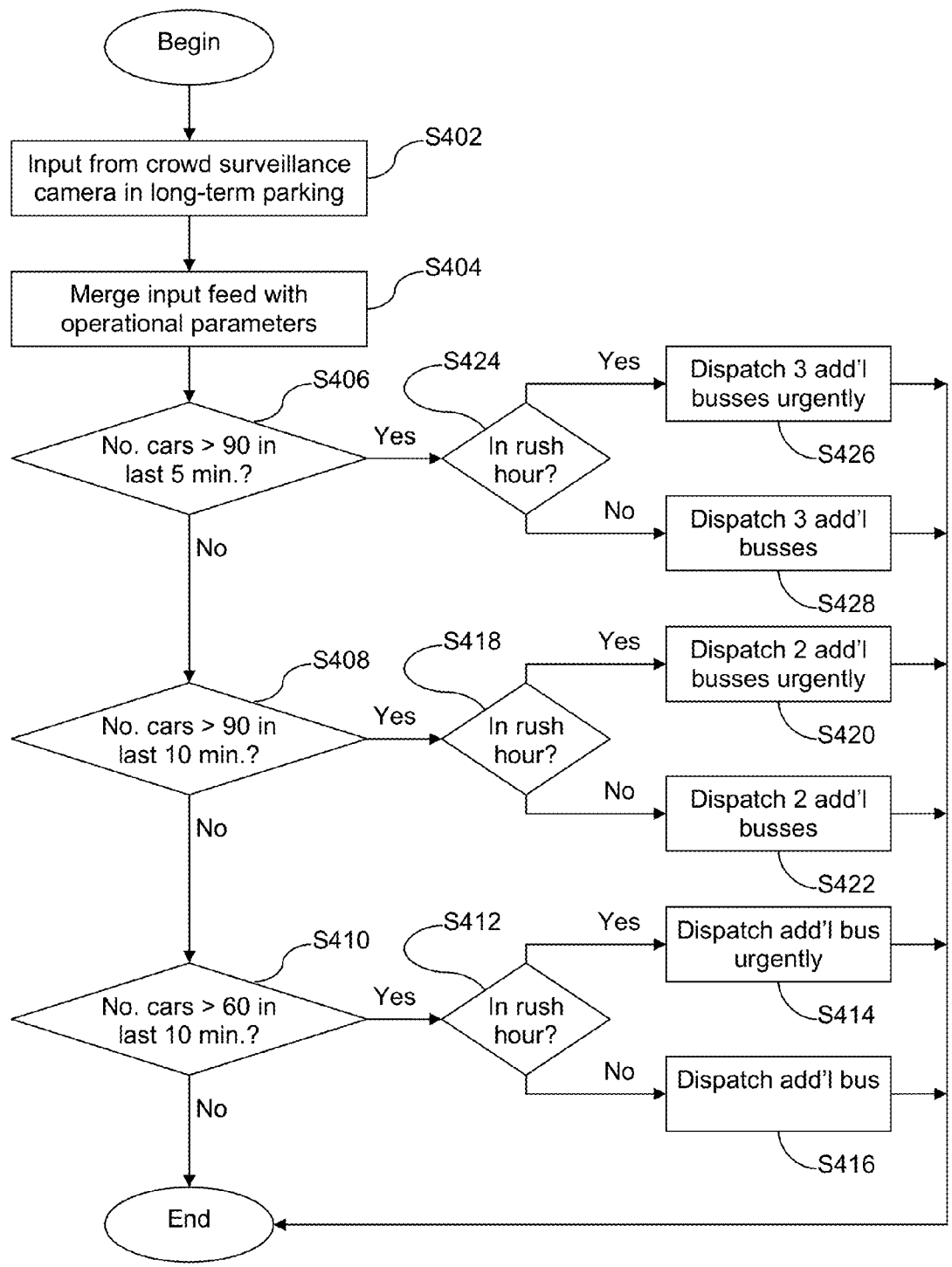
FIGS. 4-6 are flowcharts illustrating example triggers that may be defined for different parts of an airport in accordance with certain example embodiments.
Figure 5:
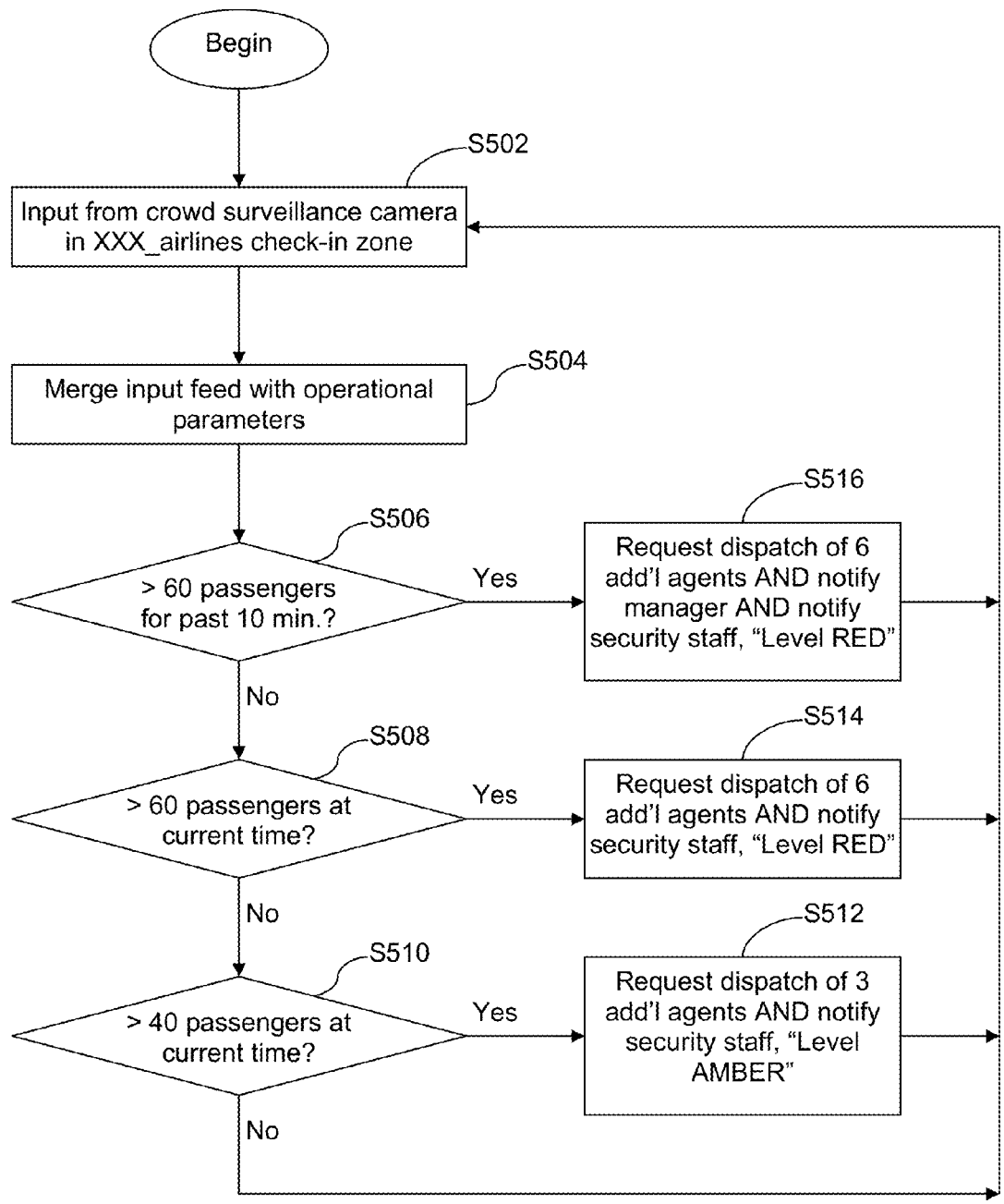
Figure 6:
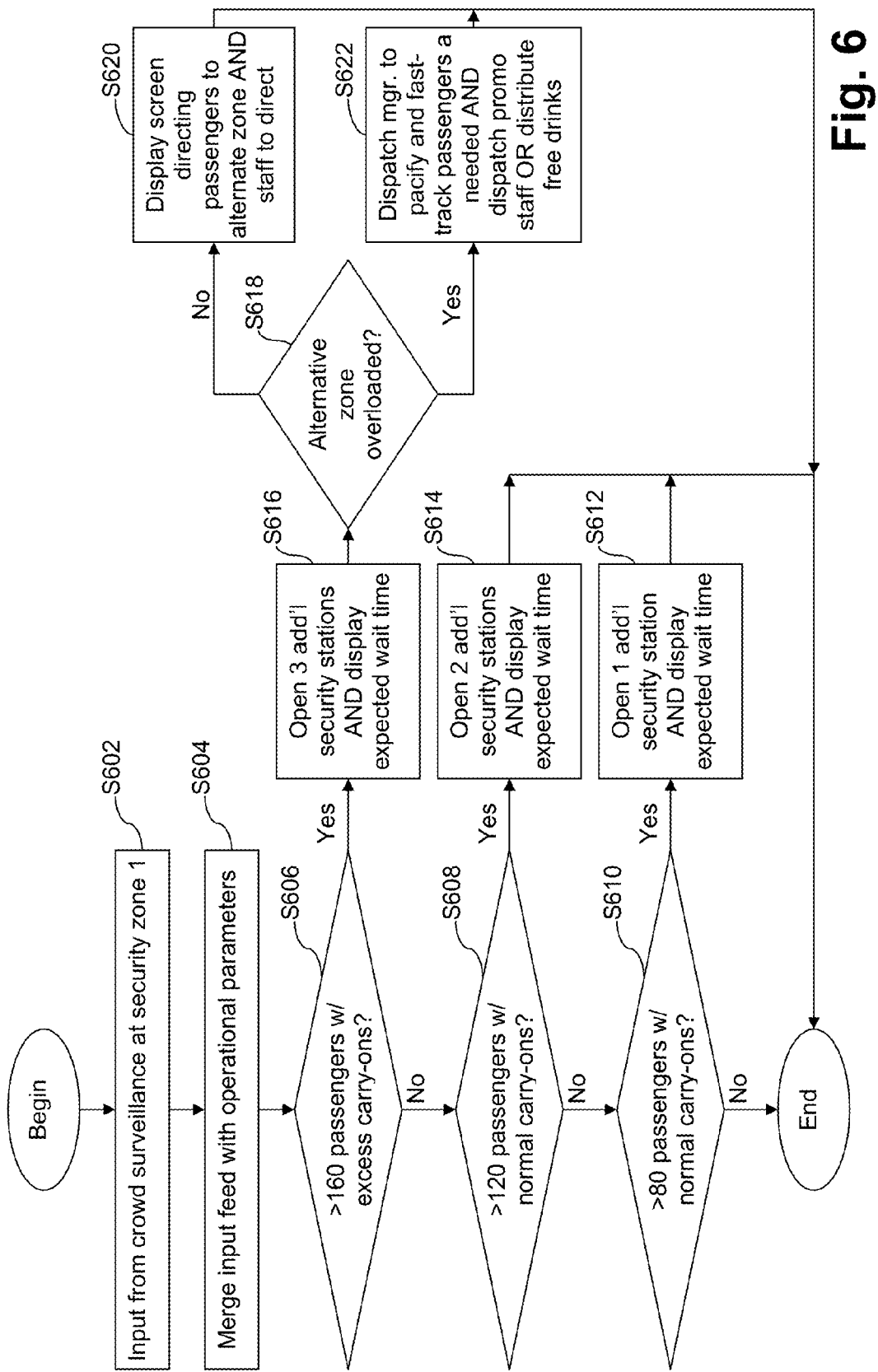

FIGS. 4-6 are flowcharts illustrating example triggers that may be defined for different parts of an airport in accordance with certain example embodiments. More particularly, FIGS. 4-6 involve triggers for long-term parking, airline check-in, and security zones. Video cameras may be installed at each area, and these cameras may be used to measure passenger volume and associated luggage. In each case, the triggers are defined based on different operational criteria, and they in turn can bring about a combination of actions in order to remedy and/or mitigate potential problems (such as delays, congestion, bottlenecks, etc.).

FIG. 4 relates to a crowd volume scenario that manages shuttle busses based on the number of cars seen entering a parking lot over a given time period and based on the time of day. An increasing number of cars in this example will automatically request the dispatch of additional shuttle busses. More particularly, input from a surveillance camera located in long-term parking is received in step S402. Data from the input feed is merged with operational parameters (e.g., average travel times for relevant time of day, etc.) in step S404. If the number of cars entering the parking lot is not greater than 90 within the last 5 minutes as determined in step S406, then a check is made in step S408 to determine whether the number of cars entering the parking lot is greater than 90 within the last 10 minutes. If it is not, then a check is made in step S410 to determine whether the number of cars entering the parking lot is greater than 60 within the last 10 minutes. If not, then the process is ended. If so, then a determination is made in step S412 as to whether the relevant time frame is rush hour. If so, an additional bus is urgently dispatched in step S414; if not, an additional bus is dispatched on a regular basis in step S416. If the determination was made in step S408 that the number of cars entering the parking lot is greater than 90 within the last 10 minutes, then a determination is made in step S418 as to whether the relevant time frame is rush hour. If so, two additional busses are urgently dispatched in step S420; if not, two additional busses are on a regular basis in step S422. If the determination was made in step S406 that the number of cars entering the parking lot is greater than 90 within the last 5 minutes, then a determination is made in step S424 as to whether the relevant time frame is rush hour. If so, three additional busses are urgently dispatched in step S426; if not, three additional busses are on a regular basis in step S426.

FIG. 5 relates to a crowd volume scenario that monitors crowd volume within each check-in zone and requests more or fewer check-in agents and modifies the master alert level signs for staff. In step S502, input from the surveillance camera at the airlines check-in zone XXX is received. In step S504, it is merged with operational parameters. If the number of passengers in the zone is not greater than 60 for the last 10 minutes as determined in step S506, then a determination is made in step S508 as to whether the number of passengers in the zone is greater than 60 at the current time. If not, a determination is made in step S510 as to whether the number of passengers in the zone is greater than 40 at the current time. If not, then the process is ended. On the other hand, if it is, then step S512 requests that three additional agents be dispatched and notifies security staff that there is a growing number of people about to enter security lines (e.g., as indicated by the amber level designation). If the determination is made in step S508 that the number of passengers in the zone is greater than 60 at the current time, then step S514 requests that six additional agents be dispatched and notifies security staff that there is a rapidly growing number of people about to enter security lines (e.g., as indicated by the red level designation). Similarly, if the determination is made in step S506 that the number of passengers in the zone has been greater than 60 for the last 10 minutes, then step S516 requests that six additional agents be dispatched, notifies the manager that there might be a problem for possible follow-up investigation, and notifies security staff that there is a rapidly growing number of people about to enter security lines (e.g., as indicated by the red level designation).

FIG. 6 relates to a crowd volume scenario that monitors crowd levels at each security gate. This scenario combines actual individual users with recognizable of carry-on luggage amounts (e.g., also recognized from video source and analysis). With this information, the trigger system can intelligently suggest the number of additional security screens required and, in if necessary or desirable, also update electronic display screens to direct passengers to other locations. In FIG. 6, input from the surveillance cameras is received in step S602. It is then merged with operational parameters in step S604.

If the number of passengers in the zone is not greater than 160 and if excess carry-on baggage is not present as determined in step S606, then a determination is made in step S608 as to whether the number of passengers in the zone is greater than 120 and whether there is at least a normal amount of carry-on baggage. If not, a determination is made in step S610 as to whether the number of passengers in the zone is greater than 80 and whether there is at least a normal amount of carry-on baggage. If not, then the process is ended. On the other hand, if it is, then step S612 requests that one additional security station be opened, calculates the expected waiting time, and displays it (e.g., in minutes/seconds or some other relevant unit). If the determination is made in step S608 that the number of passengers in the zone is greater than 120 and that there is at least a normal amount of carry-on baggage, then step S614 requests that two additional security stations be opened, calculates the expected waiting time, and displays it. Similarly, if the determination is made in step S606 that the number of passengers in the zone is greater than 160 and that there is an excess amount of carry-on baggage, then step S616 requests that three additional security stations be opened, calculates the expected waiting time, and displays it. An additional check is made in step S618 to determine whether an alternative security zone is overloaded. If not, the step S620 updates the display to direct passengers to the alternative security zone and tells staff that they are to direct passengers to the alternative security zone. On the other hand, if it is, then step S622 dispatches a manager to pacify the passengers, fast-track passengers on an as-needed basis, and dispatches promotional staff to provide giveaways or distribute free drinks, etc.

Extensive actual data may be recorded to ascertain an average time for certain processes to be completed. This may include, for example, the average time taken to proceed from long-term parking to a check-in zone with a given number of cars arriving within a given time period, the average time taken to proceed through check-in and/or security screening, with a given number of passengers waiting in line ahead, etc. Some or all this data may be computed in advance and stored to a data store (e.g., a database that can be queried, etc.). Once these parameters have been determined, a set of conditions can be provided to the trigger scenarios to in turn determine whether an action should be triggered. If an action is triggered, the impacts of such actions also can be measured and, with sufficient actual data, an appropriate level of action (e.g., number of shuttle buses, number of agents, number of security personnel, etc.) can be prescribed, e.g., to help deal with like future events.

In this way, as system users observe and/or as the system itself observes the outcomes of the actions, they can "learn" from them and measure their effectiveness because they will receive feedback from the action manager. This feedback can be used to modify future behavior (e.g., if a given action in a given zone is cancelled), prescribe more/less ameliorative behavior, prescribe ameliorative behavior for longer/shorter time periods, etc. Over time, the trigger scenarios themselves can be updated automatically, automatically flagged for suggested manual updating, etc.

Example Facial Recognition Scenarios

The example facial recognition scenarios in this section build on the prior actions as the severity of the situation escalates. The example trigger uses a scoring system (explained in more detail below) to rate the information provided, with combinations of increasing actions based on the facial recognition feed and rating including providing information on a monitor at the security zone as to estimated waiting time and alternative security area recommendations. Alternative actions, depending on the severity of the facial recognition rating, in this example include providing cool drinking water, sending a clown to entertain younger passengers, increasing staffing levels, providing giveaways and associated store information, and helping with information management, e.g., in order to make a personal appearance to mitigate negative sentiment and investigate further potential necessary or desirable actions (e.g., fast-tracking certain passengers to the front of the queue, etc.). Although a set of cumulative scenarios are provided, it will be appreciated that non-overlapping and/or non-cumulative scenarios may be provided in different example embodiments. In other words, the scenarios need not be related to one another in different example embodiments.

Example Scenario Escalation Level 1: If passengers in this area are increasingly unhappy, then calculate and display an estimated waiting time, allowing them to do something else rather than remain in zone.

IF Facial Recognition score ="sad" OR "angry" OR "agitated" OR "frowning" OR "Shaking head" >50% AND previous feed <50% THEN:
   Activate Event 1: Display "Estimated waiting time is [extract from algorithm] minutes"
   AND
   Activate Event 2: IF security zone 2 <50, Display "In order to avoid delays please proceed to security zone 2"

Example Scenario Escalation Level 2: If the unhappiness increases, then update the display; and if there is capacity in another zone, direct passengers to that new zone. Also, contact security personnel to let them know to expect an additional surge of passengers.

IF Facial Recognition score ="sad" OR "angry" OR "agitated" OR "frowning" OR "Shaking head" >60% AND previous feed <60% THEN:
   Activate Event 1: Display "Estimated waiting time is [extract from algorithm] minutes"
   AND
   Activate Event 2: IF security zone 2 <50, Display "In order to avoid delays please proceed to security zone 2
   AND
   Activate Event 3a: Notify security supervision monitor to ramp up X stations
   AND IF check-in zone feed >100 heads THEN
   Activate Event 3b: Notify security supervision monitor to ramp up Y stations Example Scenario Escalation Level 3: If the unhappiness increases further and the temperature is high, then provide drinking water; if children comprise a significant portion of the crowd, then also request some entertainment to occupy the crowd.

IF Facial Recognition score ="sad" OR "angry" OR "agitated" OR "frowning" OR "Shaking head" >70% AND previous feed <60% THEN:
   Activate Event 1: Display "Estimated waiting time is [extract from algorithm] minutes"
   AND
   Activate Event 2: IF security zone 2 <50, Display "In order to avoid delays please proceed to security zone 2"
   AND
   Activate Event 3a: Notify security supervision monitor to ramp up X stations
   AND IF check-in zone feed >100 heads THEN
     Activate Event 3b: notify security supervision monitor to ramp up Y stations
   AND IF temperature >80 degrees:
     Activate Event 4: Notify paramedic team / display "Drinking Water required at zone 1"
   AND IF Facial Recognition score ="sad" OR "angry" OR "agitated" OR "frowning" OR "Shaking head" >70% AND previous feed <60% AND >40% crowd =age estimation <10 years THEN:
     Activate Event 5: notify airport entertainment squad "dispatch clown to security zone 1"

Example Scenario Escalation Level 4: If the unhappiness increases further and there are identifiable segments within the audience, then issue various retail offers to them:

IF Facial Recognition score ="sad" OR "angry" OR "agitated" OR "frowning" OR "Shaking head" >80% AND previous feed <70% THEN:
   Activate Event 1: Display "Estimated waiting time is [extract from algorithm] minutes"
   AND
   Activate Event 2: IF security zone 2 <50, Display "In order to avoid delays please proceed to security zone 2"
   AND
   Activate Event 3a: Notify security supervision monitor to ramp up X stations
   AND IF check-in zone feed >100 heads THEN
     Activate Event 3b: notify security supervision monitor to ramp up Y stations
   AND IF temperature >80 degrees:
     Activate Event 4: Notify paramedic team / display "Drinking Water required at zone 1"
   AND IF Facial Recognition score ="sad" OR "angry" OR "agitated" OR "frowning" OR "Shaking head" >70% AND previous feed <60% AND >40% crowd =age estimation <10 years THEN:
     Activate Event 5: notify airport entertainment squad "dispatch clown to security zone 1"
   AND IF crowd members ="female" >60% AND >age 40
     Activate Event 6a: dispatch promotion staff with perfume samples from Store A and store A location & offer flyer ELSE, dispatch promotion staff with chocolate samples from store B with store B location & offer flyer
   AND IF crowd members ="male" >70% AND >age 21
     Activate Event 6b: dispatch promotion staff with beer samples from Store C with store C location & offer flyer Example Scenario Escalation Level 5: If the unhappiness increases further, escalate to request human intervention and increase security.

IF Facial Recognition score ="sad" OR "angry" OR "agitated" OR "frowning" OR "Shaking head" >85% AND previous feed <80% THEN:
   Activate Event 1: Display "Estimated waiting time is [extract from algorithm] minutes"
   AND
   Activate Event 2: IF security zone 2 <50, Display "In order to avoid delays please proceed to security zone 2"
   AND
   Activate Event 3a: Notify security supervision monitor to ramp up X stations
   AND IF check-in zone feed >100 heads THEN Activate Event 3b: notify security supervision monitor to ramp up Y stations AND IF temperature >80 degrees:

Activate Event 4: Notify paramedic team / display "Drinking Water required at zone 1"

AND IF Facial Recognition score ="sad" OR "angry" OR "agitated" OR "frowning" OR "Shaking head" >70% AND previous feed <60% AND >40% crowd =age estimation <10 years THEN:

Activate Event 5: notify airport entertainment squad "dispatch clown to security zone 1"

AND IF crowd members ="female" >60% AND >age 40

Activate Event 6a: dispatch promotion staff with perfume samples from Store A and store A location & offer flyer ELSE, dispatch promotion staff with chocolate samples from store B with store B location & offer flyer AND IF crowd members ="male" >70% AND >age 21

Activate Event 6b: dispatch promotion staff with beer samples from Store C with store C location & offer flyer

AND

Activate Event 7: Display "Red Flag Alert @ Security zone 1" [personal management attention required]

It will be appreciated that inheritance may be used rather than repeating code from lower-level scenarios.

Emotional data may be scored in any suitable manner, e.g., based on indicia gathered from surveillance cameras. In certain example embodiments, the facial recognition system may deliver a set of enumerations (e.g., low, medium, and high) for each emotion in a predefined list of emotions (including, for example, anger, agitation, sadness, etc.). Certain example embodiments may use a look-up mechanism to convert these enumerations into percentage values so that calculations can be performed on them. An example facial recognition scoring system look-up table that may be used in connection with certain example embodiments is as follows:

| Facial Recognition Scoring System | | | |
|---|---|---|---|
| Signs of | Scoring | | |
| Anger | low = 20% | medium = 30% | high = 40% |
| Agitation | low = 10% | medium = 20% | high = 30% |
| Sadness | low = 10% | medium = 20% | high = 30% |
| Frowning | low = 10% | medium = 20% | high = 30% |
| Shaking head | low = 20% | medium = 30% | high = 40% |
| Hands on head or eyes | low = 20% | medium = 30% | high = 40% |

It will be appreciated that other emotions may be specified in addition to, or in place of, some or all of these emotions. It also will be appreciated that "complex" emotion types may be based on one or more underlying "simple" emotion types. Complex emotions types may be scored as combinations of (potentially weighted) simple emotions.

The scenarios described above may draw from such a table where a combination of facial attributes first would be rated on a scale of low-to-high and then given a score (e.g., 10% or 20%) depending on the relevant weighting of that particular facial expression. As such, if someone were showing a low level of "anger" (20%), a high level of "frowning" (30%) and a medium level of "shaking head" (30%), the score would add up to 70%, and this might (depending on the score in the previous period) lead to an action level 4 or 5 according to the pseudo-code extracts shown above.

As is the case in with the example scenarios described above, the definition of when any given facial expression is defined as "low", "medium", or "high" matters. Likewise, the scoring examples (shown here as 10% or 20% for low) are important in prescribing the appropriate level of action if so referenced by the related scenario.

As described below, historical data may be used to ascertain the best scoring system. It will be appreciated that the scoring system may be able to learn as new data is generated. For example, certain times of the day may require or benefit from a different scoring approach compared to others. Early in the morning, people may be more likely to be agitated based on pressure to make it to meetings, whereas late in the evening, people may be too tired to communicate concerns using facial expressions. Such variations may also be factored into the scoring approaches. In this vein, it will be appreciated that different look-up tables and/or other mechanisms may be specified by the scenarios themselves, in certain example embodiments. For example, eye-rubbing in an early morning context might be treated as ordinary drowsiness (and thus not scored), whereas eye-rubbing in the middle of the afternoon might be treated as sadness because it is more likely to be correlated with crying (and scored appropriately).

Example Social Media Scenarios

Social media scenarios may utilize a scoring system similar to those used by the facial recognition scenarios. Here, it may be possible to replace facial expressions like "Anger", "Agitation", etc., with an extensible lexicon of multi-language keywords (e.g., #Frustrated, #Sucks, #WastingTime, #WaitingInLine, #LackofStaff, #SoSlow, etc.). The frequency of the appearance of such keywords can then be used to provide a differentiated scoring approach. For example, if the word "Frustrated" appears once, then the score may be 20%; if it appears twice, then the rating may be 30%; and with three or more appearances, the score may be "high" and equate to 40%. An example social media scoring table that works like the example facial recognition scoring system look-up table described above and that may be used in connection with certain example embodiments is as follows:

| Social Media Scoring System | | | |
|---|---|---|---|
| Keyword | Scoring | | |
| #Frustrated | low = 20% | medium = 30% | high = 40% |
| #Sucks | low = 10% | medium = 20% | high = 30% |
| #WastingTime | low = 10% | medium = 20% | high = 30% |
| #WaitingInLine | low = 10% | medium = 20% | high = 30% |
| #LackofStaff | low = 20% | medium = 30% | high = 40% |
| #SoSlow | low = 20% | medium = 30% | high = 40% |

In addition to the lexicon, language-specific grammar processing may be provided, e.g., to apply modifiers to these scores. The grammar logic may control for aspects such as double negatives, which could sometimes have the highest impact of specific words used.

Figure 7:
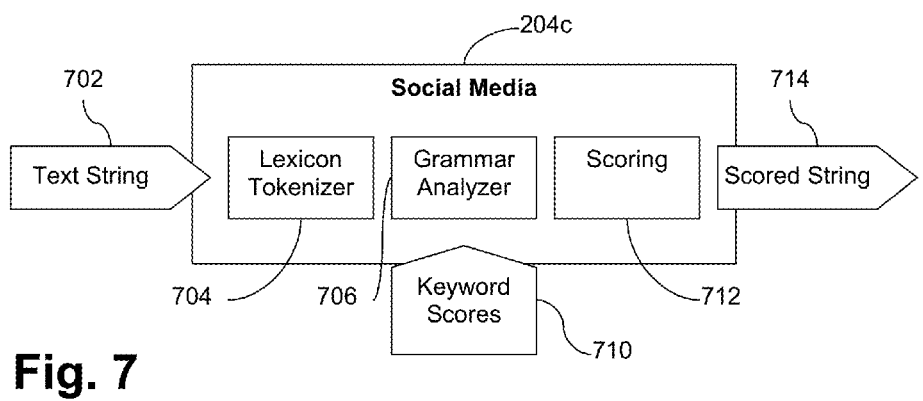
FIG. 7 is a block diagram of a social media sentiment analysis tool that may be used in connection with certain example embodiments.

In this regard, FIG. 7 is a block diagram of a social media sentiment analysis tool 204c that may be used in connection with certain example embodiments. The component 204c receives text strings 702 (potentially in any language) from the social media feeds. A lexicon tokenizer 704 annotates that string 702, and each identifiable keyword that has some sentiment attached to it (e.g., those keywords that have entries within the keyword scoring table) is highlighted with its "raw" score (e.g., as specified in the table). The annotated string is passed to the grammar analyzer 706, which includes or references language-specific grammar rules that remove and adjust sentiment attributes for the keywords due to use of negative keywords (e.g., "not good"—which should have a negative sentiment), double negatives (e.g., "not bad"— which should have a positive sentiment), etc. The raw scores derived from the keyword scores 710 (e.g., retrieved from the table) and the modifications made by the grammar analyzer 706 are aggregated by the scoring module 712 to deliver a combined, single sentiment value for that incoming text string 702. This scored string 714 may be used by scenarios that can look for other specific keywords in that string, combine them to form a calculated sentiment, etc.

Figure 8:
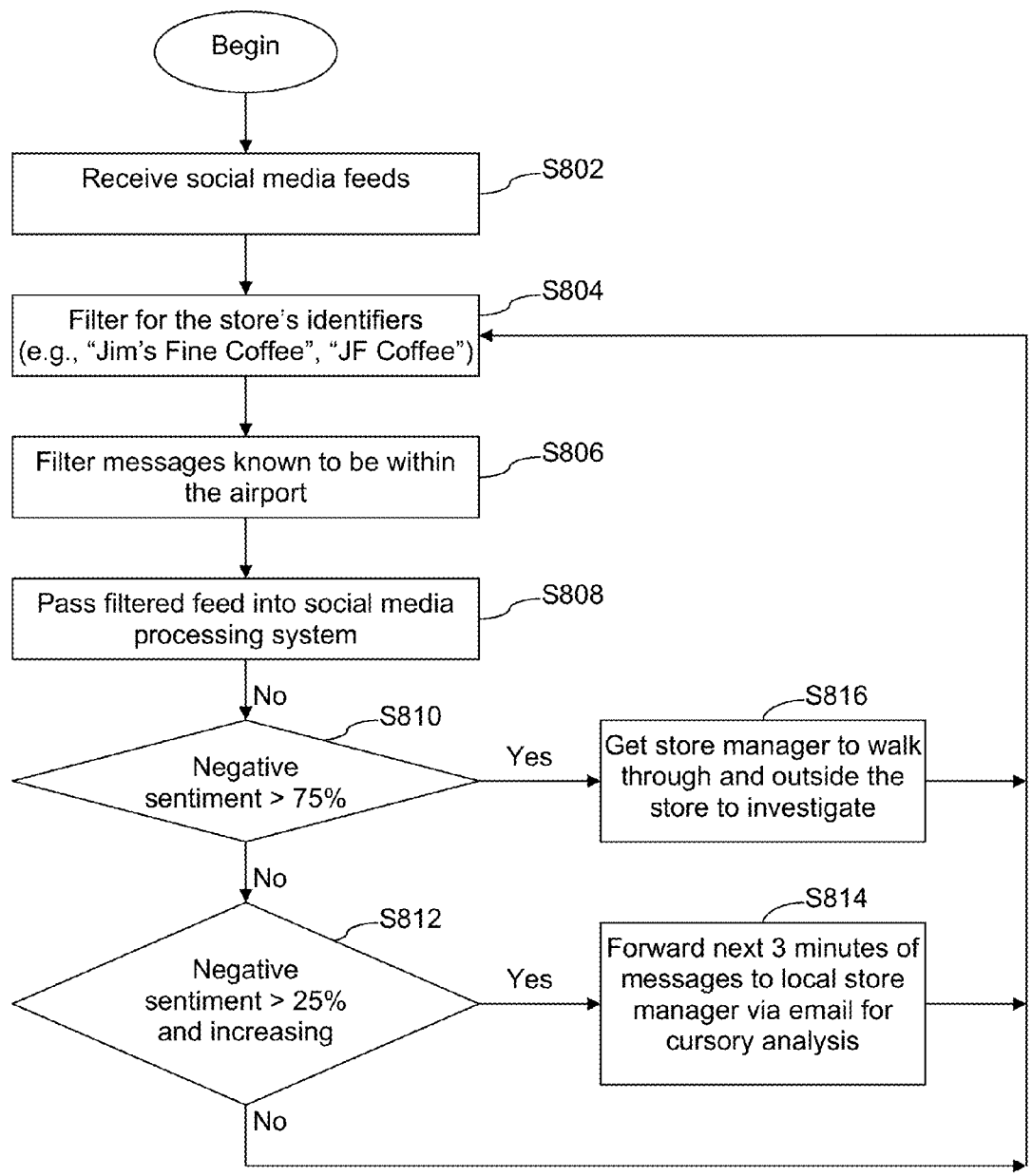
FIG. 8 is a flowchart showing an example social media scenario that may be used in certain example embodiments.

FIG. 8 is a flowchart showing an example social media scenario that may be used in certain example embodiments. In brief, the FIG. 8 example social media scenario includes the case where a relatively low, but increasing negative sentiment, creates a summary email of the relevant messages (e.g., from all sources) and emails that digest to the store manager for cursory investigation. If the negative sentiment then increases dramatically, it then alerts the store manager to manually investigate by walking through and around the store. In greater detail, social media feeds are received in step S802, and they are filtered for a store's identifiers (e.g., name, nickname, and/or variants thereof) in step S804. The subset of messages may be further filtered to identify those messages originating at or otherwise associated with the venue (e.g., based on IP address, geolocation, iBeacon, keyword, etc.) in step S506. The further filtered list is passed to the social media processing system in step S808. If negative sentiment is not greater than 75% as determined by a check made in step S810, then a check is made as to whether negative sentiment is greater than 25% and increasing (e.g., over a defined time period). If not, then the process continues monitoring messages by returning to step S804. If so, the next three minutes of messages are forwarded to the local store manager via email (e.g., in digest form) for cursory analysis in step S814. On the other hand, if the check in step S810 indicates that negative sentiment has passed 75%, then step S816 prompts the store manager to walk through and outside the store to investigate what is happening and/or what has happened.

For both facial recognition and social media scenarios, the scoring systems can be expanded to include positive facial reactions (e.g., happy, laughing, relaxed, etc.), positive keywords (#Great, #Fast, #Happy, #Excited, etc.), and/or the like. In a similar way, these facial expressions and keywords can be rated using a scoring system, and actions can be derived accordingly.

In the case of happiness and joy, and positive keywords, the operational action chosen may be "do nothing" or even to reduce staffing levels and reallocate to areas where reactions are more sensitive/negative—even if queues are longer and staffing levels are lower. Indeed, a business might make a decision that as long as the sentiment is positive, it might still be wise to react in this way. Similarly, the detection of positive sentiment might be seen as presenting a good opportunity for pushing real-time product promotions, e.g., reaching out to potential customers when their moods are better and thus their propensity to spend money is higher.

It is also feasible that fully different reactions may be observed among members the same crowd. This situation adds a level of complexity when prescribing actions, especially in extreme scenarios (e.g., when half the crowd is very angry and half the crowd is very happy). To derive the most suitable reaction, the "action" in such situations could simply be to dispatch an agent to investigate why the extreme facial and social media reactions are occurring.

Example Auxiliary Trigger Scenarios

Auxiliary trigger scenarios may in certain example instances utilize the capabilities of one or more of the trigger components (e.g., the social Media, crowd volume and/or facial recognition components) or their scenarios discussed above. Several example purposes are provided, but it will be appreciated that auxiliary trigger scenarios may use these and/or other data feeds for similar or different purposes in different example embodiments.

Real-time promotions may be distributed, for example, during a passenger situation that otherwise could be problematic (e.g., where there is a known extended waiting period). Such promotions may be a part of the solution, or at least handling, of the situation. Furthermore, passengers may be provided with as much information as possible, which could help assist them and improve their experiences. The strategy of providing both promotions and information can be helpful in avoiding increased frustration that otherwise might result if retail offers alone were delivered and interpreted as a ploy to distract the customers. The following pseudo-code represents one possible scenario that may implemented in this regard:

IF
   Crowd Volume is higher than the normal (moving average)
   AND
   Calculated delays in air traffic control suggest at least a 20 minute additional delay (despite other scenarios including possibly opening additional security gates to ease the problem)
THEN
   Display the estimated MINIMUM additional delay time on the electronic boards
     Also display the additional steps taken by airport management to alleviate the problem
   Present the promotion as a means to provide an activity during the known minimum waiting time, and deliver it in an attempt to speed up process and make passenger experience better.

By providing a technological context that conveys information, an in-road for placing promotions (e.g., free samples, flyers, discount cards, even credit cards—and indeed any information that might lead to incremental revenue—but at the same time creates a pleasant experience for the passenger) is created.

Special actions can be defined in case there is a crisis. A crisis at an airport, stadium, amusement park, museum, train station, etc., could include events such as, for example, a terrorist threat, a gunman at large, a fire, other disasters (e.g., rarer disasters such as human crush (e.g., Hillsborough Stadium, 1989)), etc. In the case of a crisis, personal safety may be made to take priority over operational efficiencies.

Once a crisis situation has been identified, its resolution may be prioritized and resulting actions may replace those actions that would normally be instigated in the interest of usual operational procedures. Crisis management procedures may include, for example: shutting down gates, turnstiles, etc., in and around the area of concern; triggering alarm systems, activating sprinkler system, etc.; notifying top management and contacting security services, emergency services (fire service, ambulance, police, etc.); notifying local stations' operational resources (e.g., staff to aid in evacuation as necessary); providing information and comfort to those most directly affected by the disaster in order to calm down crowds in case of panic or mass confusion; identifying when ramifications of the crisis have been dealt with, and returning to normal procedures (e.g., then and only then in some instances); and/or taking other actions as appropriate.

Actions taken as the result of a special situation triggered by a crisis scenario may be immediately sent to the action component and the action manager within it. Here, the actions may cover the relevant zones and have sufficient priority to overwrite or at least move ahead of any other actions in play at the current time. For example, it could be desirable to override any promotional offers shown on display boards and, instead, display emergency exit details.

Using the camera surveillance and social media analytics to recognize a conflict/crisis situation by detecting extreme levels of distress among customers (e.g., airport or railway users, visitors to a stadium, museum attendees, etc.) including panic or deep concern in life-threatening situations, could lead to the earlier recognition of the disaster than otherwise might be possible under normal circumstances (e.g., where one must wait for a bona fide report from an individual that might need to be verified, etc.). Such detection scenarios may correlate any one or more of these and/or other analytics to detect sophisticated crisis situations: a large surge of people moving into an area that is normally not populated; a significant increase in the average speed of passengers as they process through the airport (suggesting panic movement); a sudden increase in noise (e.g., bangs, screams, etc.) in an area/zone; a sudden spike in negative physical (facial) sentiment across a crowd; a significant spike in negative sentiment across social media; etc.

Figure 9:
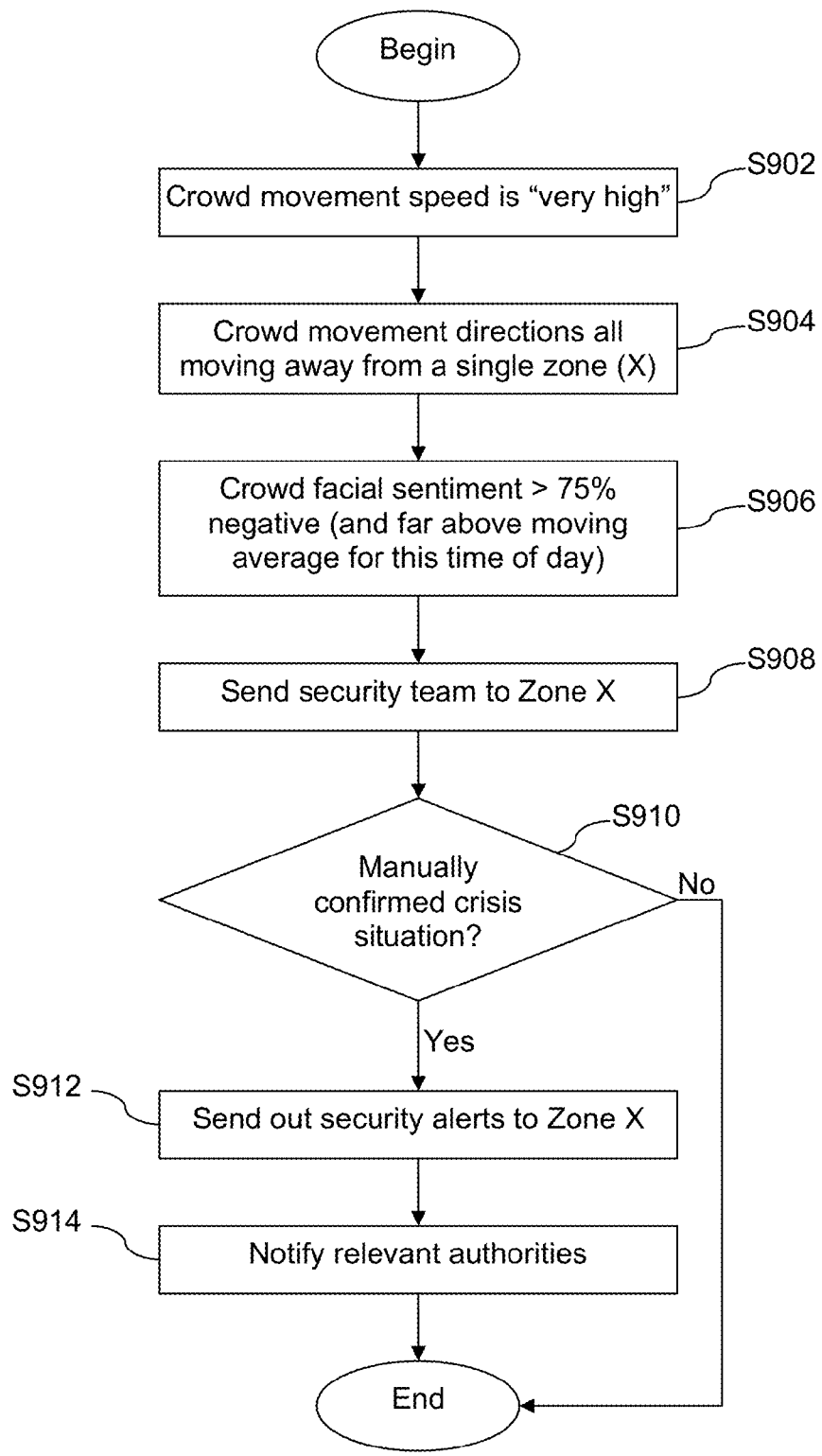
FIG. 9 is a flowchart illustrating actions that may be taken in response to an illustrative crisis scenario in accordance with certain example embodiments.

FIG. 9 is a flowchart illustrating actions that may be taken in response to an illustrative crisis scenario in accordance with certain example embodiments. In brief, there is a detection of a rapidly increasing group of passengers moving quickly away form a given zone (in steps S902 and S904, with the latter indicating a movement in all directions away from the single zone), and becoming increasingly unhappy (as detected in step S906, as the sentiment reaching more than 75% and being far above the moving average for that time of day, etc.). A security team initially and automatically is dispatched in step S908 (although it is noted that CCTV cameras of that zone may be automatically displayed to security in the surveillance room at that time in addition to, or in place of, this action). Manual confirmation of a crisis situation is sought in step S910. If there is no crisis, the process is ended. If there is a crisis, relevant security alerts are initiated in step S912, and relevant authorities are notified in step S914. The alerts may be of the highest priority and may be located within one or more specific zones. As a result, it may quash any other alerts active within the implicated zone(s).

The immediate recognition of such a (potential) crisis helps ensure that assistance can be delivered and that the overall resolution can be found, e.g., sooner than might otherwise be possible. In some instances, if noticed soon enough, the severity of the crisis situation can be mitigated (e.g., notification of a fire and the subsequent involvement of fire services and activation of sprinklers can help contain the problem). Limiting the severity of any disaster and resolving the crisis sooner—e.g., through the combined correlation of detected complex events in real-time (e.g., surge in movement, speed, sentiment, etc.) all over the same, small time window—is clearly advantageous to customers and for operational reasons.

To illustrate how actions relating to personal notification of service disruption can take place, it is useful to consider a hypothetical situation involving train delays at Paddington Station in London. If there is a significant delay due to equipment or machine failure, multiple trains may be delayed, e.g., by an hour or more. In this scenario, there are a number of problems, apart from the frustration of passengers being delayed. For instance, platform areas may become overcrowded, which can cause obstructions and possibly could be hazardous (potentially leading to the risk of a passenger, or passengers, toppling into the tracks). Station facilities and services also may become overloaded by the higher-than-normal load of waiting passengers.

By systematically notifying passengers of such delays, the above-mentioned and/or other problems can be mitigated. Such notification can be provided by way of short message service (SMS), email (for those passengers with smart phones), automated phone calls, etc. The SMS, email, or other notification can be triggered using any suitable method. For instance, such notifications may be sent (1) as soon as the equipment or machine failure and resulting delays have been identified by train operators, (2) once crowds (e.g., waiting passengers) gathering at stations have formed (e.g., as detected by camera surveillance systems that recognize significantly increased number of people waiting, heightened levels of frustration in the facial expressions of the waiting passengers, etc.), and/or (3) based on a drastic increase in the negative sentiment at the station detected by means of the analysis of social media feeds and/or the like.

These notifications can include some or all of the following and/or other information: information informing the passenger of the delay and providing an explanation (e.g., a source of the problem); providing new arrival and/or departure time(s) (which may be repeated as estimates are updated, validated, and become more accurate); recommending alternative ways to use time while waiting (such as at coffee shop, in a business lounge if available, etc.), or in case a passenger has been informed prior to arriving at the station, suggesting delaying arrival to the station; offering various forms of remedy to pacify the customer's frustration ranging from a mere apology to travel ticket discounts or other offers; etc. There are many possible benefits of providing such information including, for example, enhanced passenger perception through individually tailored customer service; eased congestion at the station; more productive use of passenger's time; passenger (customer) retention and less volumes of passenger complaints to process; increased revenues through promotional product conversions; etc.

Using the example of an airport, as mentioned above, there are a number of issues that might arise in the case of a severe delay (e.g., of one hour or more). And as outlined above, these issues are not necessarily limited to the passengers directly affected, but instead the negative signals from the frustrated customers and the crowds caused by the waiting passengers can lead to further issues including, for example, general obstruction of walkways, difficulties accessing various facilities at the airport, etc. Furthermore, in cases where passengers become irritated, tempers are more likely to flare, and any number of escalations can lead to agitation among passengers, with airline staff, with airport staff, etc. Under some circumstances, conflicts or even minor acts of violence could occur, which in turn could necessitate security services intervention, police involvement, and/or the like—all adding to the already existing problem of operational inefficiencies. All of this may cause general frustration in passengers, leading to negative customer experiences, something which service providers would want to avoid in order to avoid discouraging repeat business, etc.

It may be possible to avoid such unpleasantness and instead offer a more pleasant customer experience in some instances, e.g., if affected passengers can be redirected to waiting facilities, a lounge, or the like. The following and/or other services can be offered at such a facility: beverages and food (either for free or for a fee); restroom facilities; Internet and/or other business-related services and/or equipment; travel information (e.g., which gate to proceed to and how long it takes to walk there, expected time of departure (updated frequently), alternative methods of transport (and for example in the case of domestic or short-haul international flights, this could be a recommendation to use rental cars or trains potentially made in cooperation with the operators of these services); etc.); airline and/or airport special offers and promotion (e.g., as a direct way to claw back costs of running the lounge facility; and/or the like. This information can be provided both via overhead screens, PA systems, through airport and/or airline staff in the area where the issue is manifesting itself and/or via staff attending to the users of the facilities, etc. The technique and point at which delayed passengers may be redirected to such waiting area facilities may be similar to the approach discussed above, at least in certain example instances.

Advantageously, the recommended action, resulting from the recognition of passenger (or generally customer) emotion and sentiment, may seek to improve customers' perceptions and experiences of a given service. It may in some instances be possible to turn a negative situation (e.g., severe delays and prolonged waiting times) that normally cause customer frustration into a positive scenario, whereby customers find themselves in a pleasant environment with useful information, adequate facilities, and good services (potentially even somewhat akin to "VIP treatment"). Thus, it is possible to achieve the above-described and/or other benefits with the addition of the potential for revenue enhancement by the airline or airport operator.

Figure 10:
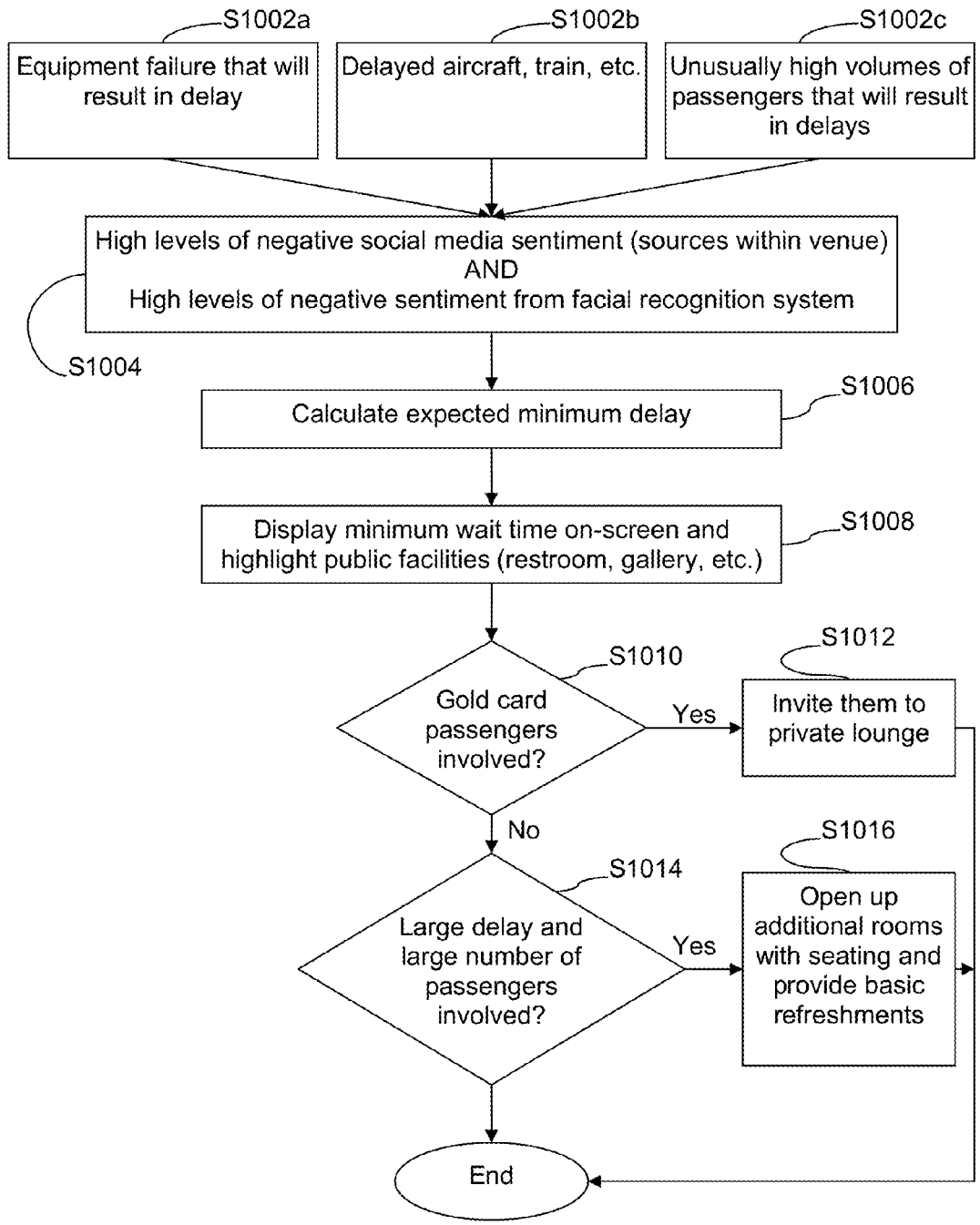
FIG. 10 is a flowchart illustrating actions that may be taken to divert people to waiting areas in accordance with certain example embodiments.

FIG. 10 is a flowchart illustrating actions that may be taken to divert people to waiting areas in accordance with certain example embodiments. In the FIG. 10 example scenario, the system monitors for a known delay situation type, which may be, for example, an equipment failure as in S1002a; a delayed aircraft, train, or the like as in S1002b; unusually high volumes of passengers as in S1002c; etc. Once such a situation is detected, step S1004 will determine whether there is a pervading negative sentiment (e.g., high levels of negative social media sentiment from sources within the venue, detected from facial recognition system, etc.). An expected minimum delay, locations of nearest rest facilities, and/or other useful information, will be determined in step S1006, and such information may be displayed or otherwise made public to assist all members in step S1008. In step S1010, a determination may be made as to whether any "status" passengers are involved (e.g., through facial recognition, scanning the rolls of those scheduled to board a plane, etc.). If so, those passengers may be contacted (via email, phone calls, SMS messages, PA announcements, display notifications, etc.) to invite them to partake in additional offerings (e.g., private lounge access, with possibly extended hours, etc.) in step S1012. If things continue to worsen (e.g., as determined in step S1014), then additional facilities may be employed in step S1016. For instance, additional (normally empty) rooms can be opened up, basic refreshments can be served, etc. As in the sample scenario above, a high ambient temperature could accelerate the affirmative decision-making process of step S1014, and water may be provided, etc.

The ability to enable timely provision of special services in a case of severe delays or the like can be a differentiator for a service or product provider.

As People Carriers (e.g., shuttle buses, train cars, conveyer belts, etc., found in airports and similar locations that help ferry passengers between buildings) become more crowded, this can cause discomfort or even panic for its users. It thus may be helpful to have triggering scenarios that consider overcrowded people carriers and emotional status/sentiment matrix(es).

In this regard, by using camera surveillance, a "crowded vs. agitation matrix" could be designed. It may "learn" from correlating extreme passenger/user overload (e.g., as determined via a camera feed) and potential emotional/sentiment recognition. The latter can be ascertained by means of surveillance camera feed (e.g., facial recognition) and social media, as well as by conducting random surveys of customer having just used these services.

Assuming that severe overload could cause anything from mild discomfort to extreme agitation, increased stress, and even distress and ultimately panic, it may be desirable to ensure that overload does not reach extreme levels. It thus would be desirable to achieve a suitable balance for operators of such services because on they will be interested in managing operational expenses while also not wanting to deter users from refusing to return for repeat business if stress levels, discomfort, and/or feeling of disrespect are prevalent. By capturing actual data, operators can allow capacity to reach a certain level before reacting to add capacity (additional carriers), reducing the use of carriers in place, etc., thus avoiding undesirable scenarios that could lead to customer retention problems.

In case an individual intends to smuggle contraband or conceal weapons, explosives, or the like, or intends to comment an act of a criminal nature, a specific subset of facial expressions and body language may be expected. By using a highly sensitive camera surveillance system that can detect extreme levels of nervousness or unease by way of facial recognition and physical attributes (e.g., fidgeting, twitching, sweating, etc.), an alarm or alert can be activated so that attention is drawn to the individual and security personnel (or police) can heighten the usual levels of scrutiny, thus increasing the chances of identifying and thwarting potential perpetrators.

This system may be applicable when allowing access to arenas for large events, large buildings in capital cities, for emigration and immigration at borders, in airports or train stations where there is a reduced expectation of privacy, etc. It can also be extended to the inside of a bank, helping to potentially preempt robberies and increasing the chances of addressing the risk proactively (e.g., by locking down access to tellers, setting off an alarm, alerting security staff, etc.).

Lessons from scenario analysis may help responsive, enforcement, and/or monitoring officials understand and improve the more fully autonomous real-time scenarios, e.g., to continually add new more fully automated surveillance scenarios that take into account other emotional state and/or other data feed information. Certain example embodiments may incorporate a learning mechanism and feed back data on the effectiveness of different scenarios, e.g., to rate such scenarios in terms of accuracy, suggest whether old scenarios should be removed, suggest whether new scenarios should be added (and potentially what data should be analyzed therein), whether scenarios should be re-weighted, etc.

As indicated above, certain example embodiments may be tied into security systems at the venue. Such integration may be used, for example, to shut down gates, trigger fire alarms and/or sprinklers, call police, etc., e.g., as a user-defined response. Such integration also may enable certain users and/or user types to have live look-in privileges. For instance, TSA pre-screen customers may have a view of the number of people in line, people who have boarding passes may be able to view people mover areas, security personnel may be able to see all areas of a venue, managers who manage a collection of stores may be able to see their stores and/or areas adjacent to them, etc.

It will be appreciated that certain example embodiments may incorporate emotional and/or quantified subjective information from alternative sources such as, for example, information gained from surveys that users must complete before accessing Wi-Fi, surveys filled out voluntarily (e.g., after being properly scored or otherwise normalized to account for self-selection bias and/or the like), etc.

Although certain example embodiments are presented as providing a holistic approach (e.g., an end-to-end system that, in the airport context, deals with situations from passenger pre-arrival at a departure airport through passenger arrival at an arrival airport and possibly to a hotel, etc.), certain example embodiments may provide a more focused view. For instance, in the airport context, certain example embodiments may be directed to an airport, an airline, shops within an airport, etc.

Although certain example embodiments have been described in connection with airports, it will be appreciated that the example techniques set forth herein may be used in other contexts. For instance, it might be desirable to consider quantified streams of emotional and/or other more subjective streams in other large venues such as, for example, stadium, amusement park, museum, train station, etc. Scenario-related operations may be performed in real-time and/or at later times, e.g., as more data becomes available. For instance, data from information sources may be provided synchronously and/or asynchronously in different cases.

Although certain example embodiments are discussed in connection with "real-time" functionality, it will be appreciated that there may be some practical and/or unavoidable delays in some instances. Thus, real-time functionality may be understood to include substantially real-time functionality, functionality that is as close to real-time as possible, functionality that is not intentionally delayed or only insignificantly delayed for some reason, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An information processing system, comprising:
at least one data feed relevant to an area under surveillance, the area under surveillance having operational resources deployed thereto, the area under surveillance operating at an operational efficiency attributable at least in part to the operational resources deployed thereto; and
a memory storing a plurality of trigger scenarios, at least some of the trigger scenarios being represented by a set of rules that takes into account at least (a) information regarding an inferred emotional state of a plurality of individuals located in the area under surveillance and (b) additional data that pertains to the area under surveillance but is unrelated to inferred emotional state information;
a machine learning system; and
processing resources including at least one processor;
wherein the processing resources are configured to at least:
 facilitate the receipt of information corresponding to system-relevant events over the at least one data feed;
 evaluate at least some of the trigger scenarios stored in the memory in view of at least some of the system-relevant events corresponding to the information received via the at least one data feed to determine whether an incident might be occurring and/or might have occurred in connection with the operational resources deployed to the area under surveillance;
 in response to a determination that a given incident might be occurring and/or might have occurred, select an action to be taken, the action being selected as an appropriate response for the given incident and involving a change impacting the deployment of the operational resources to cause a related alteration in the operational efficiency of the area under surveillance in a desired manner, the action being flagged for one of immediate dispatch and delayed dispatch;
 add to a priority queue maintained in the memory representations of actions flagged for delayed dispatch, the priority queue facilitating dynamic reprioritization for actions flagged for delayed dispatch;
 prompt actions flagged for immediate dispatch to be undertaken immediately, and prompt actions flagged for delayed dispatch to be undertaken based on their relative positions in the priority queue;
 determine effectiveness metrics for prompted actions; and
 provide the determined effectiveness metrics for the prompted actions to the machine learning system to cause the machine learning system to (i) assess, in response to the prompted actions, how the operational efficiency has changed and whether there has been a dynamic reaction based on inferred emotional state information, and (ii) influence how future actions are selected and/or implemented.

2. The system of claim 1, wherein at least some of the trigger scenarios specify one or more possible actions that may be taken and criteria for determining when such possible action(s) should be taken.

3. The system of claim 1, wherein at least some of the trigger scenarios are pre-programmed default trigger scenarios.

4. The system of claim 3, wherein at least some other trigger scenarios are adaptable over time.

5. The system of claim 1, wherein at least some of the trigger scenarios are automatically adaptable over time.

6. The system of claim 1, wherein the processing resources are further configured to at least assess feedback regarding evaluated trigger scenarios and automatically generate suggested modifications thereto.

7. The system of claim 6, wherein suggestable modifications include adding a new trigger scenario, removing an existing trigger scenario, and updating an existing trigger scenario.

8. The system of claim 1, wherein information receivable via the at least one data feed is structured to embed a representation of an inferred emotional state.

9. The system of claim 8, wherein representations of inferred emotional states include quantifications of perceived subjective emotional feelings of individuals, derived from video and/or social media related instructions of said individuals.

10. The system of claim 1, wherein quantified representations of inferred emotional states are scored in accordance with a rubric.

11. The system of claim 10, wherein the rubric includes assignments of numerical scores to different discrete levels of each emotional state.

12. The system of claim 11, wherein the rubric is automatically updatable over time.

13. The system of claim 1, wherein system-relevant events include one or more objective measures of activities associated with the area under surveillance.

14. The system of claim 1, wherein at least some of the trigger scenarios specify a plurality of possible actions that may be taken, wherein the plurality of possible actions in the respective trigger scenarios are defined to escalate in intensity in accordance with a corresponding increase in severity of the incident.

15. A method of monitoring an area under surveillance, the area under surveillance having operational resources deployed thereto, the area under surveillance operating at an operational efficiency attributable at least in part to the operational resources deployed thereto, the method comprising:
  receiving information corresponding to system-relevant events over at least one data feed;
  evaluating, using at least one processor, one or more trigger scenarios in view of at least some of the system-relevant events corresponding to the information received via the at least one data feed to determine whether an incident might be occurring and/or might have occurred in connection with the operational resources deployed to the area under surveillance, a plurality of trigger scenarios being stored to a memory, at least some of the trigger scenarios being represented by a set of rules that takes into account at least (a) information regarding an inferred emotional state of a plurality of individuals located in the area under surveillance and (b) additional data that pertains to the area under surveillance but is unrelated to inferred emotional state information;
  responsive to a determination that a given incident might be occurring and/or might have occurred, selecting an action to be taken, the action being selected as an appropriate response for the given incident and involving a change impacting the deployment of the operational resources to cause a related alteration in the operational efficiency of the area under surveillance in a desired manner, the action being flagged for one of immediate dispatch and delayed dispatch;
  adding to a priority queue maintained in the memory representations of actions flagged for delayed dispatch, the priority queue facilitating dynamic reprioritization for actions flagged for delayed dispatch;
  prompting actions flagged for immediate dispatch to be undertaken immediately, and prompting actions flagged for delayed dispatch to be undertaken based on their relative positions in the priority queue;
  determining effectiveness metrics for prompted actions; and
  providing the determined effectiveness metrics for the prompted actions to a machine learning system to cause the machine learning system to (i) assess, in response to the prompted actions, how the operational efficiency has changed and whether there has been a dynamic reaction based on inferred emotional state information, and (ii) influence how future actions are selected and/or implemented.

16. The method of claim 15, wherein at least one of the trigger scenarios is a default trigger scenario that has been automatically adapted over time.

17. The method of claim 15, wherein information receivable via the at least one data feed is structured to embed a representation of an inferred emotional state.

18. The method of claim 17, wherein representations of inferred emotional states include quantifications of perceived subjective emotional feelings of individuals, derived from video and/or social media related instructions of said individuals.

19. The method of claim 17, wherein quantified representations of inferred emotional states are scored in accordance with an automatically updatable rubric that includes assignments of numerical scores to different discrete levels of each emotional state.

20. The method of claim 15, wherein system-relevant events include one or more objective measures of activities associated with the area under surveillance.

21. A non-transitory computer readable storage medium tangibly storing a program comprising instructions that, when executed, in connection with a computer system including a processor that is controlled by the instructions, at least:
  monitor an area under surveillance, the area under surveillance having operational resources deployed thereto, the area under surveillance operating at an operational efficiency attributable at least in part to the operational resources deployed thereto;
  receive information corresponding to system-relevant events over at least one data feed;
  evaluate one or more trigger scenarios in view of at least some of the system-relevant events corresponding to the information received via the at least one data feed to determine whether an incident might be occurring and/or might have occurred in connection with the operational resources deployed to the area under surveillance, a plurality of trigger scenarios being stored to a memory of the computer system, at least some of the trigger scenarios being represented by a set of rules that takes into account at least (a) information regarding an inferred emotional state of a plurality of individuals located in the area under surveillance and (b) additional data that pertains to the area under surveillance but is unrelated to inferred emotional state information;
  responsive to a determination that a given incident might be occurring and/or might have occurred, select an action to be taken, the action being selected as an appropriate response for the given incident and involving a change impacting the deployment of the operational resources to cause a related alteration in the operational efficiency of the area under surveillance in a desired manner, the action being flagged for one of immediate dispatch and delayed dispatch;

add to a priority queue maintained in the memory representations of actions flagged for delayed dispatch, the priority queue facilitating dynamic reprioritization for actions flagged for delayed dispatch;

prompt actions flagged for immediate dispatch to be undertaken immediately, and prompt actions flagged for delayed dispatch to be undertaken based on their relative positions in the priority queue;

determine effectiveness metrics for prompted actions; and provide the determined effectiveness metrics for the prompted actions to a machine learning system to cause the machine learning system to (i) assess, in response to the prompted actions, how the operational efficiency has changed and whether there has been a dynamic reaction based on inferred emotional state information, and (ii) influence how future actions are selected and/or implemented.

22. The non-transitory computer readable storage medium of claim 21, wherein at least one of the trigger scenarios is a default trigger scenario that has been automatically adapted over time.

23. The non-transitory computer readable storage medium of claim 21, wherein information receivable via the at least one data feed is structured to embed a representation of an inferred emotional state.

24. The non-transitory computer readable storage medium of claim 23, wherein representations of inferred emotional states include quantifications of perceived subjective emotional feelings of individuals, derived from video and/or social media related instructions of said individuals.

25. The non-transitory computer readable storage medium of claim 23, wherein quantified representations of inferred emotional states are scored in accordance with an automatically updatable rubric that includes assignments of numerical scores to different discrete levels of each emotional state.

26. The system of claim 1, wherein the area under surveillance is surveilled using video cameras.

27. The system of claim 1, wherein the area under surveillance is surveilled by monitoring social media posts.

28. The system of claim 1, wherein the representations of actions flagged for delayed dispatch have associated therewith severity and time-to-live values, the priority queue being managed to adjust relative positions of elements therein based on changing severity values and to remove representations based on lapsed time-to-live values.

29. The system of claim 28, wherein actions to be taken are selected from programmatically-defined action scenarios, and wherein the machine learning system is configured to automatically adapt at least some trigger scenarios over time in response to the determined effective metrics.

30. The system of claim 29, wherein the machine learning system is configured to rate for accuracy at least some trigger scenarios.

* * * * *